June 14, 1949. F. C. YOHN 2,472,931
FLOW CAMERA DOCUMENT-COPYING MACHINES
Filed Jan. 11, 1945 24 Sheets-Sheet 1
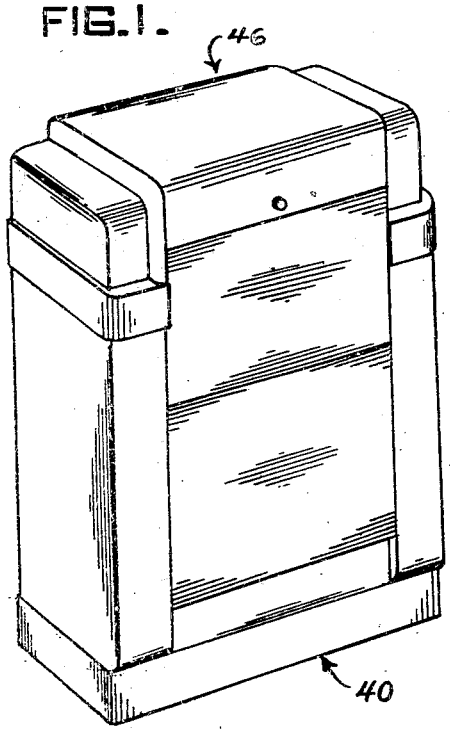
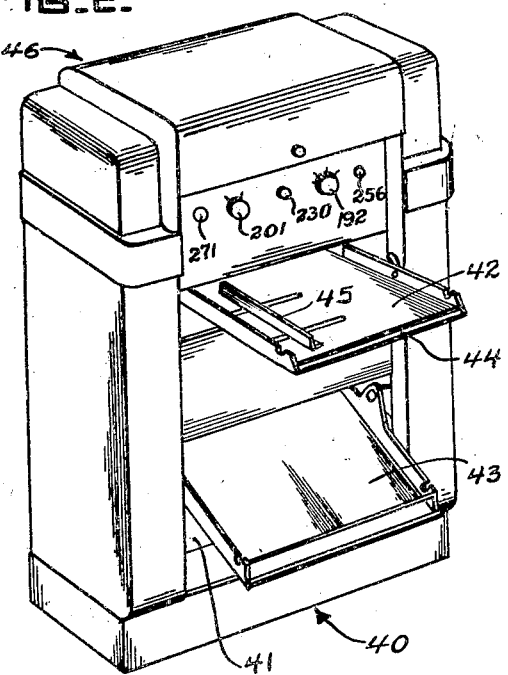
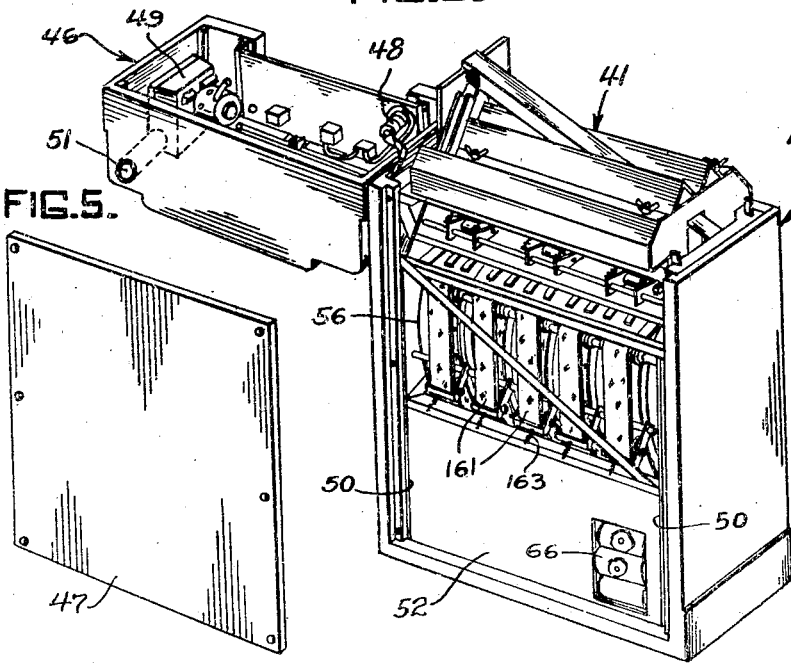
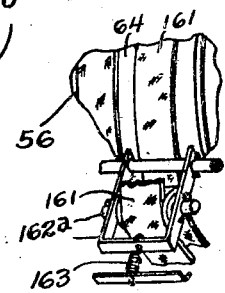
INVENTOR.
FRED C. YOHN
BY
ATTORNEYS.

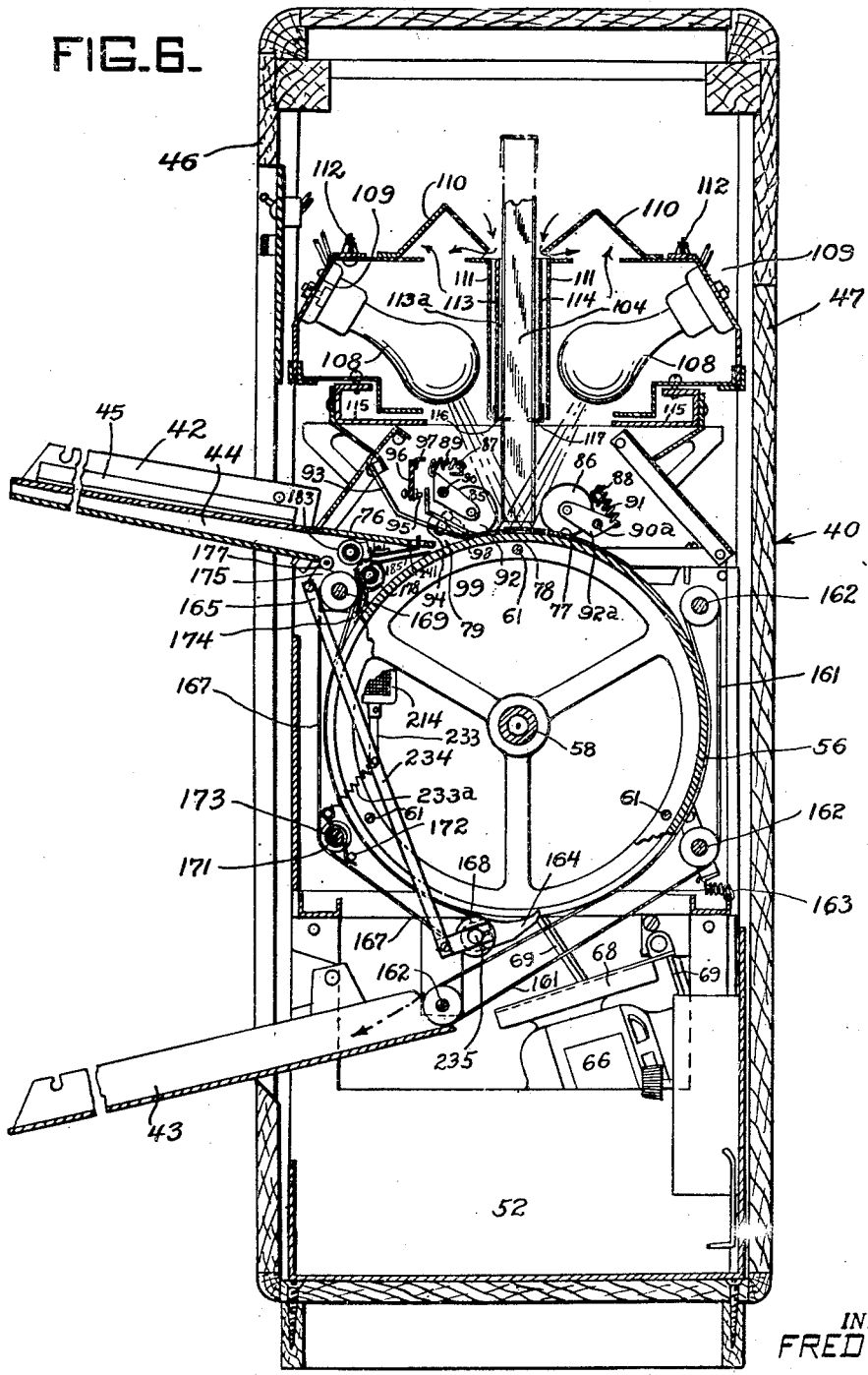

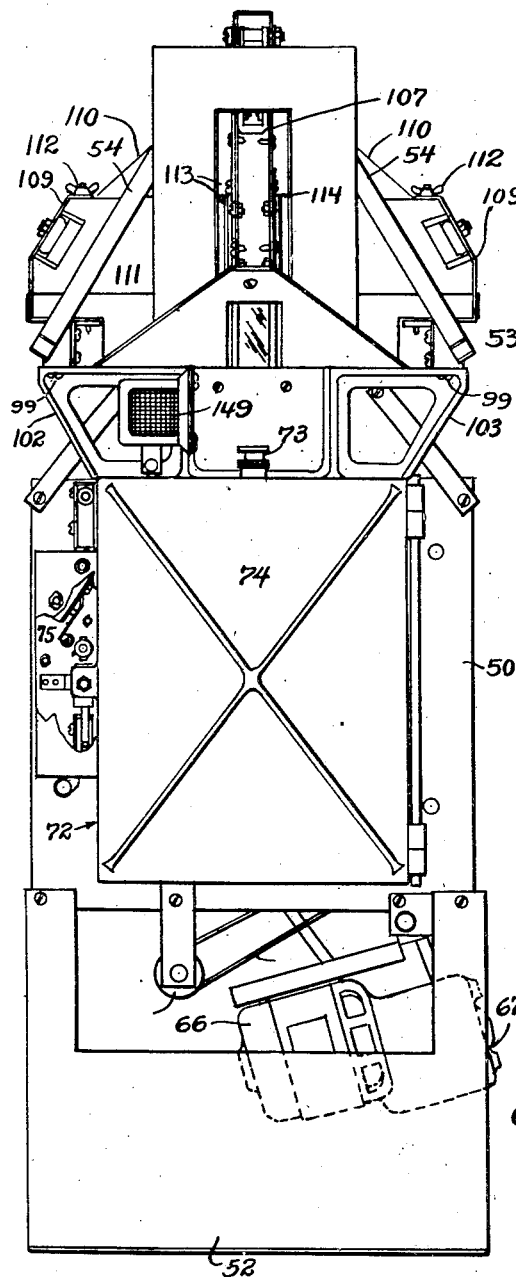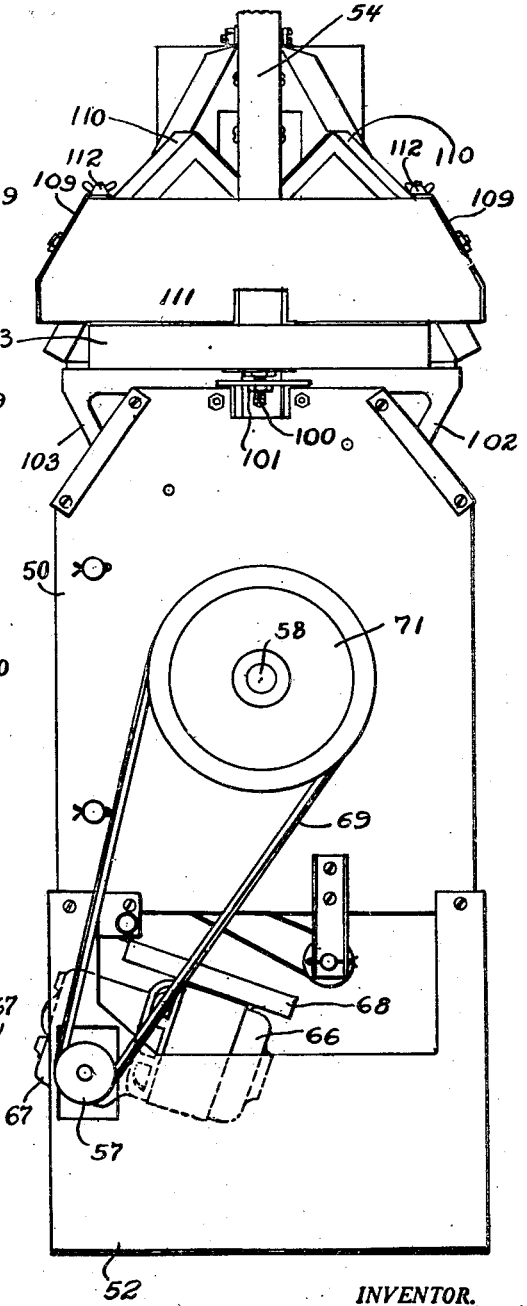

June 14, 1949. F. C. YOHN 2,472,931
FLOW CAMERA DOCUMENT-COPYING MACHINES
Filed Jan. 11, 1945 24 Sheets-Sheet 4

INVENTOR.
FRED C. YOHN
BY
Van Deventer & Griss
ATTORNEYS

June 14, 1949.  F. C. YOHN  2,472,931
FLOW CAMERA DOCUMENT-COPYING MACHINES
Filed Jan. 11, 1945  24 Sheets-Sheet 7
FIG.12.
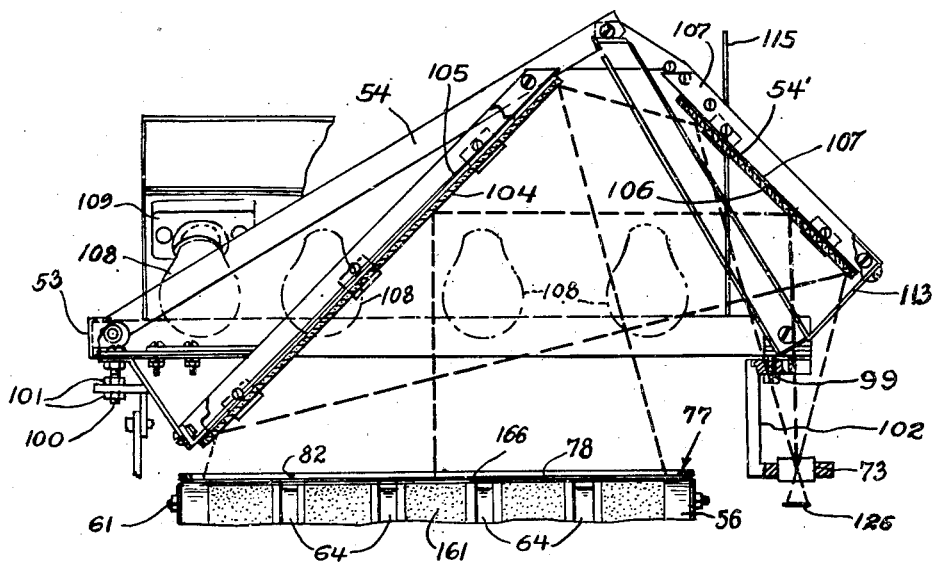
FIG.13.
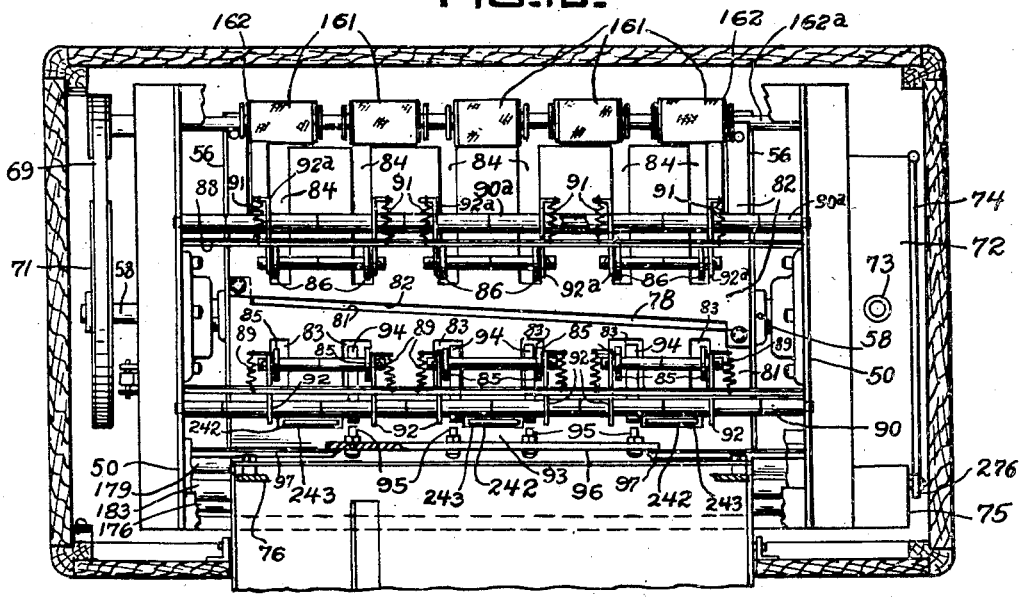
FIG.14.
INVENTOR.
FRED C. YOHN
BY
*Van Deventer + Grier*
ATTORNEYS.

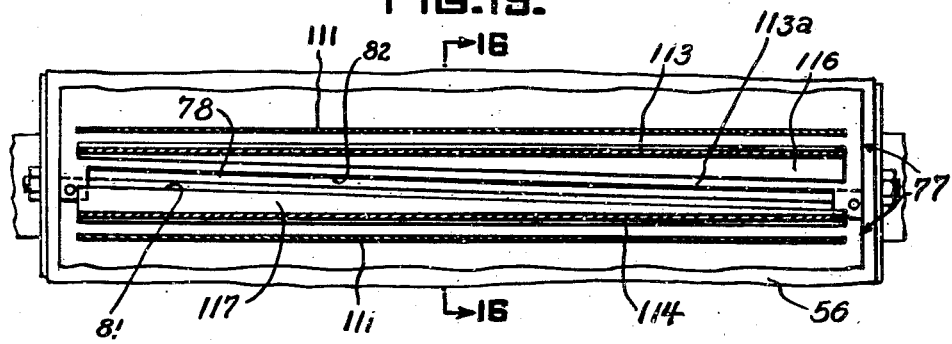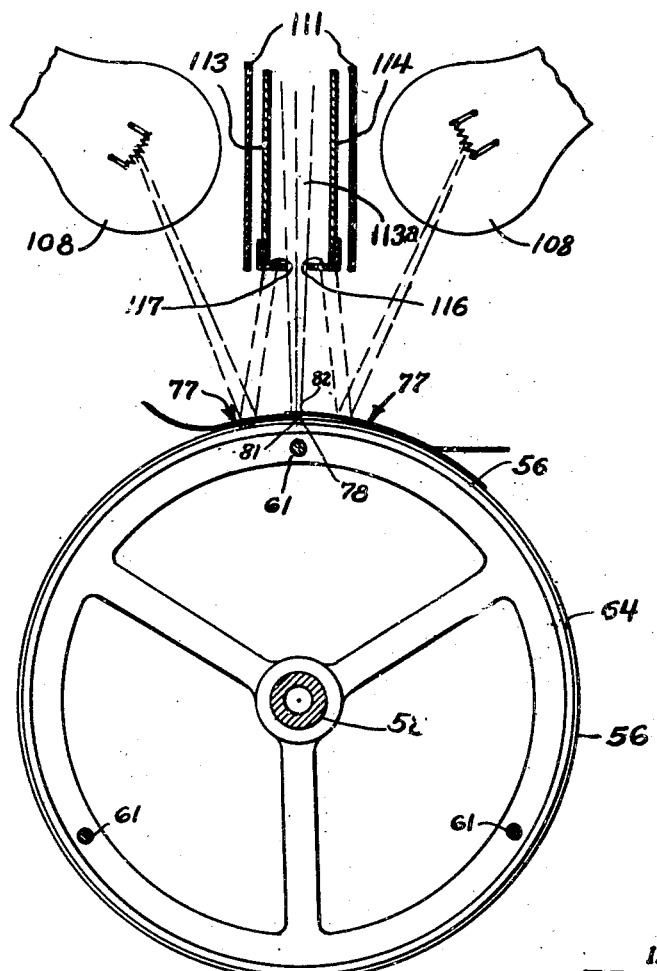

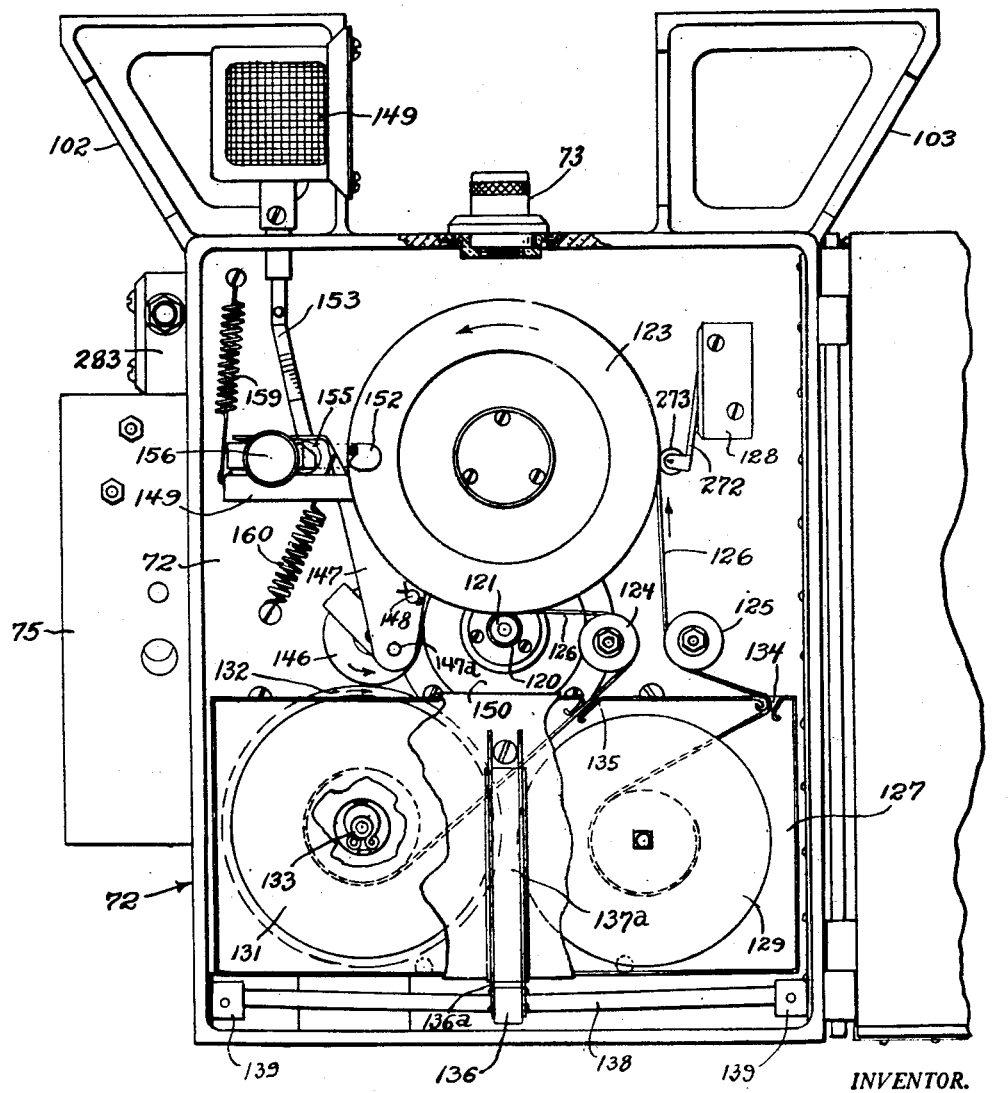

June 14, 1949. F. C. YOHN 2,472,931
FLOW CAMERA DOCUMENT-COPYING MACHINES
Filed Jan. 11, 1945 24 Sheets-Sheet 10
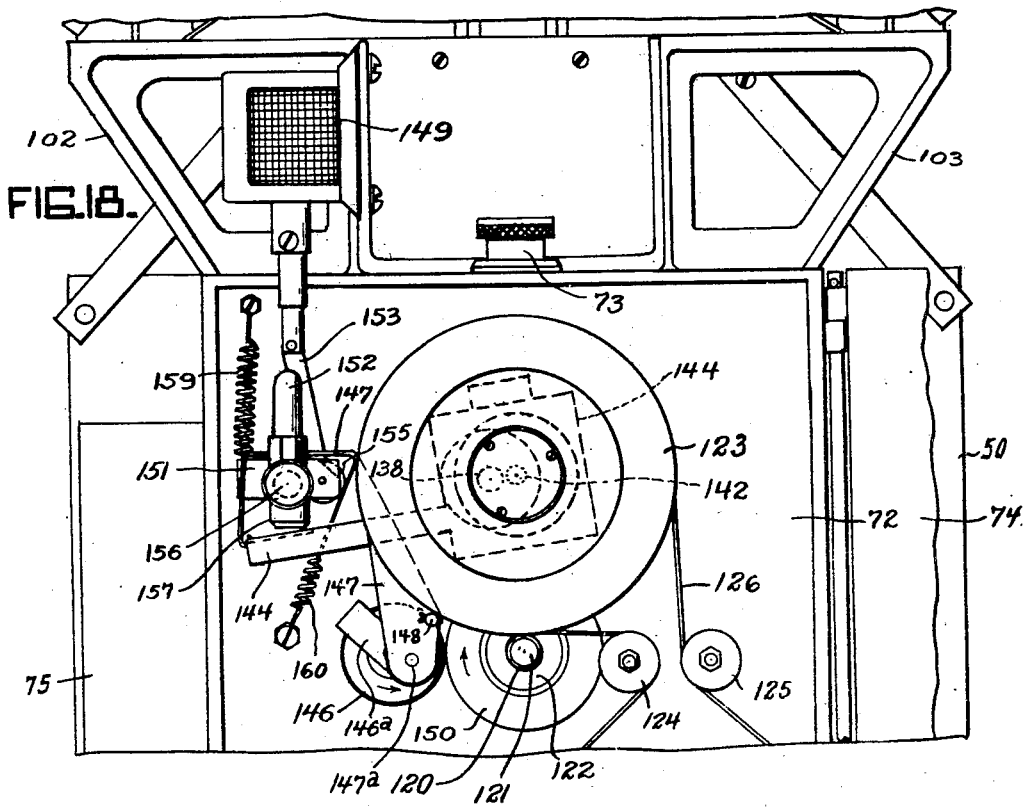
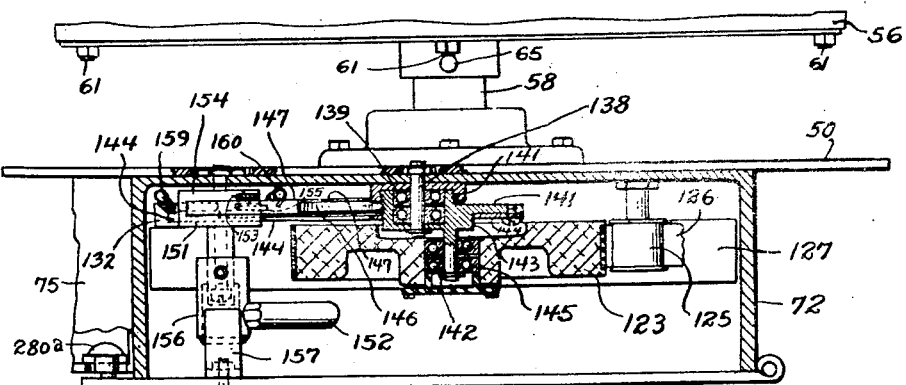
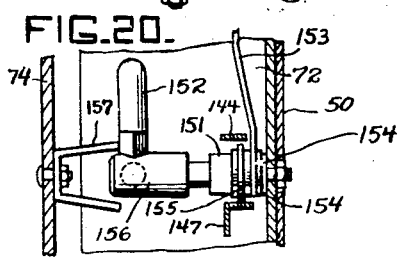
INVENTOR.
FRED C. YOHN
BY
ATTORNEYS.

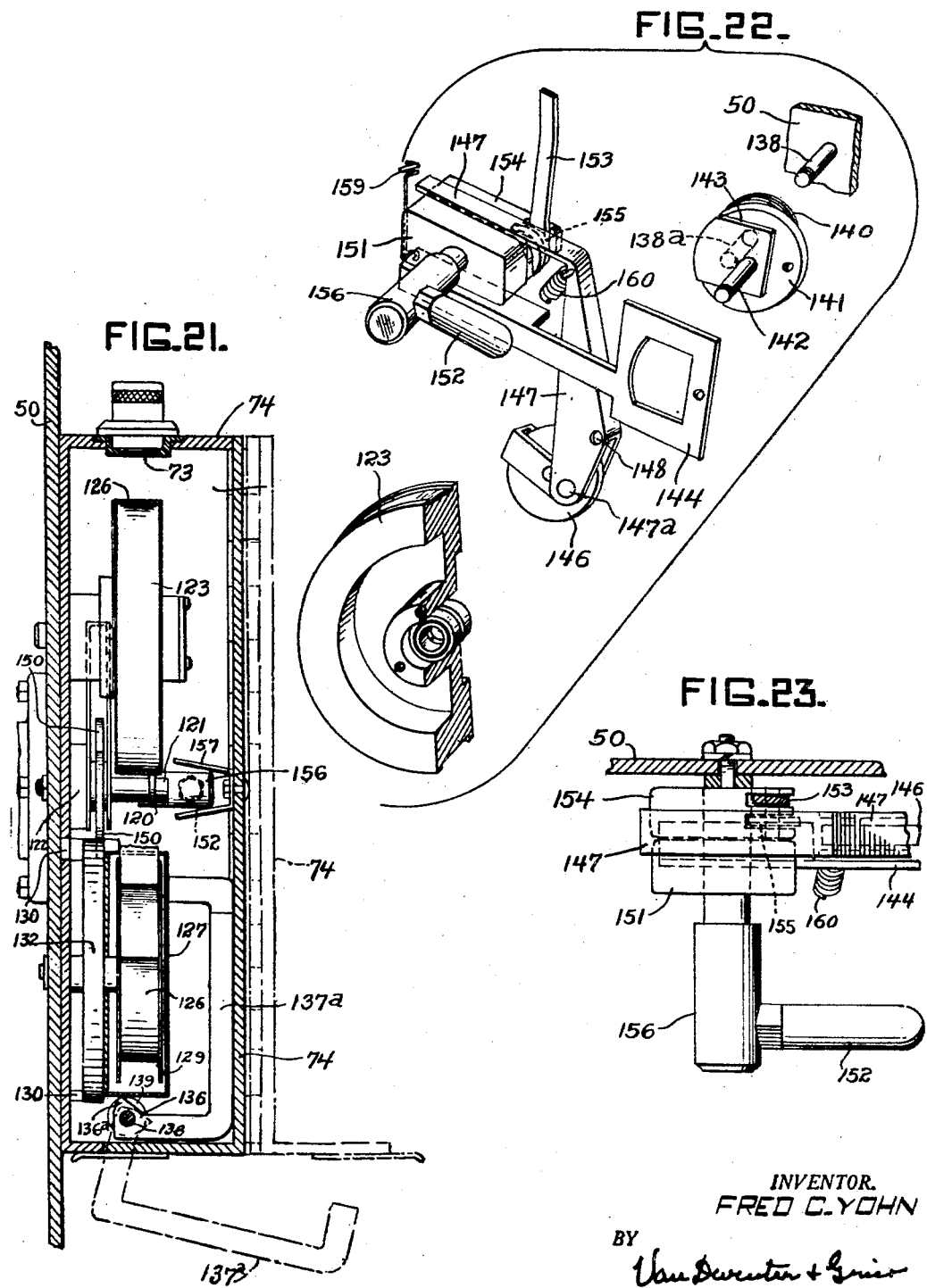

June 14, 1949.  F. C. YOHN  2,472,931
FLOW CAMERA DOCUMENT-COPYING MACHINES
Filed Jan. 11, 1945  24 Sheets-Sheet 12
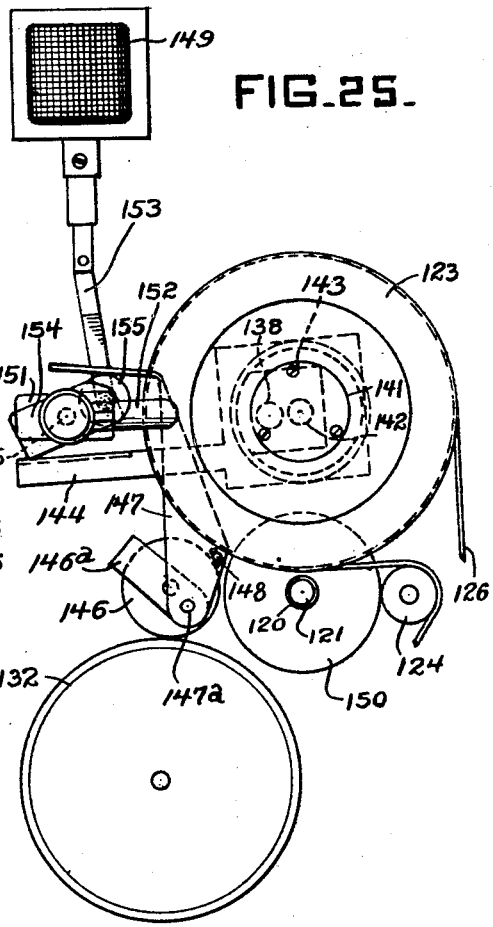
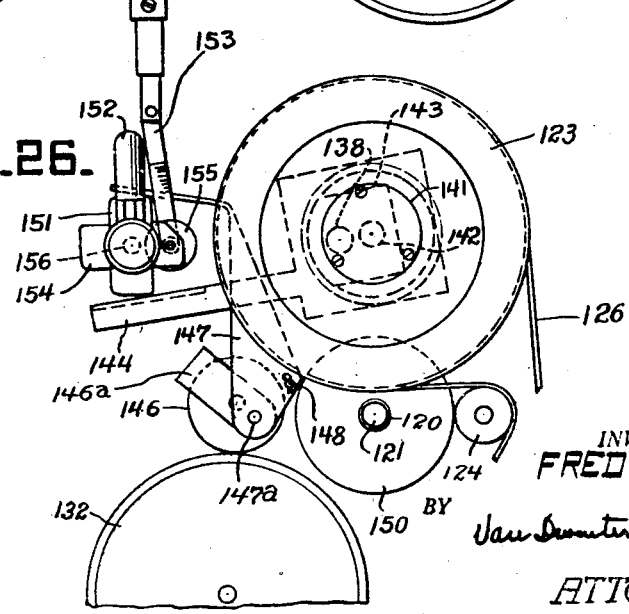
INVENTOR.
FRED C. YOHN
BY
ATTORNEYS.

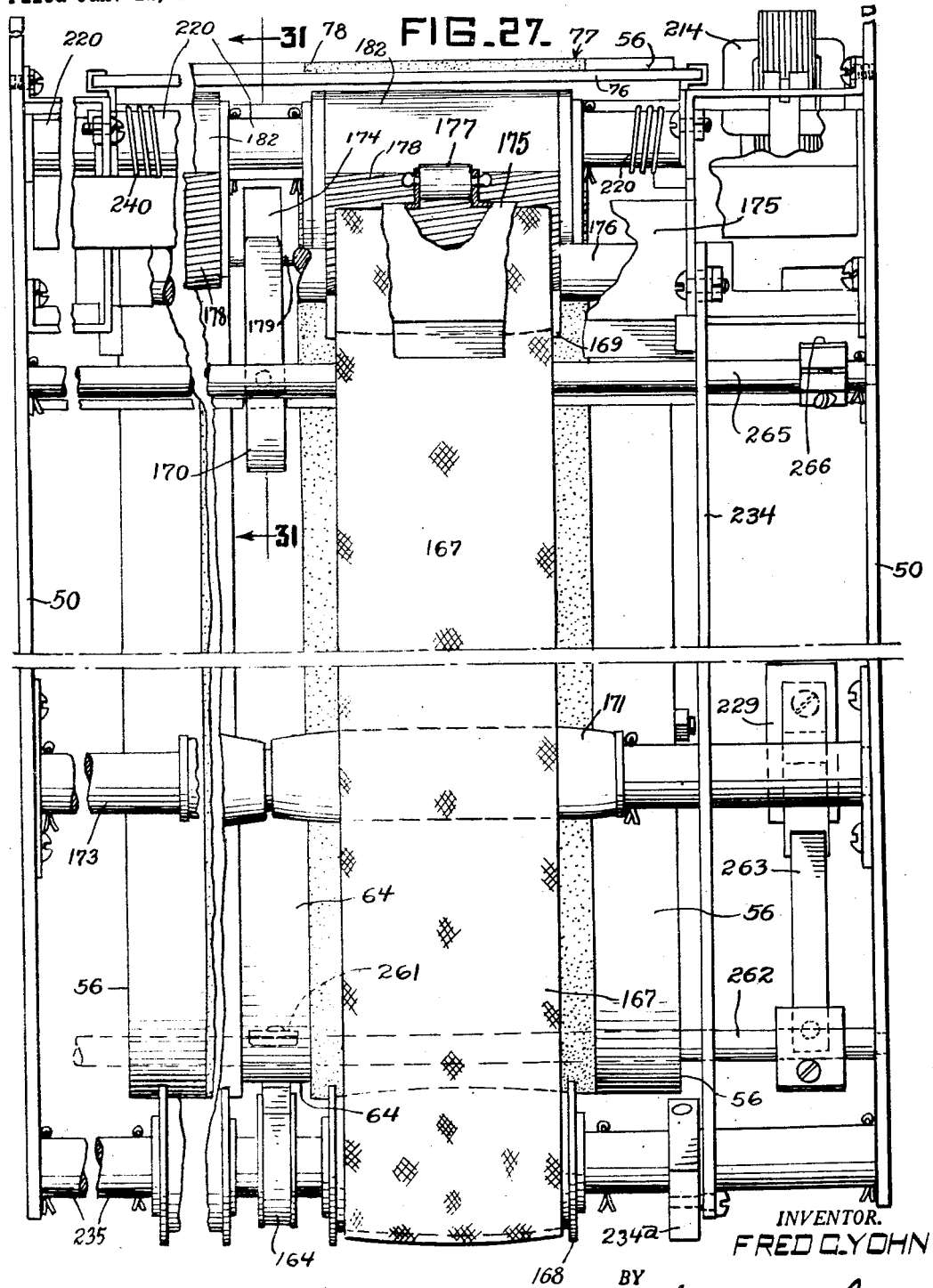

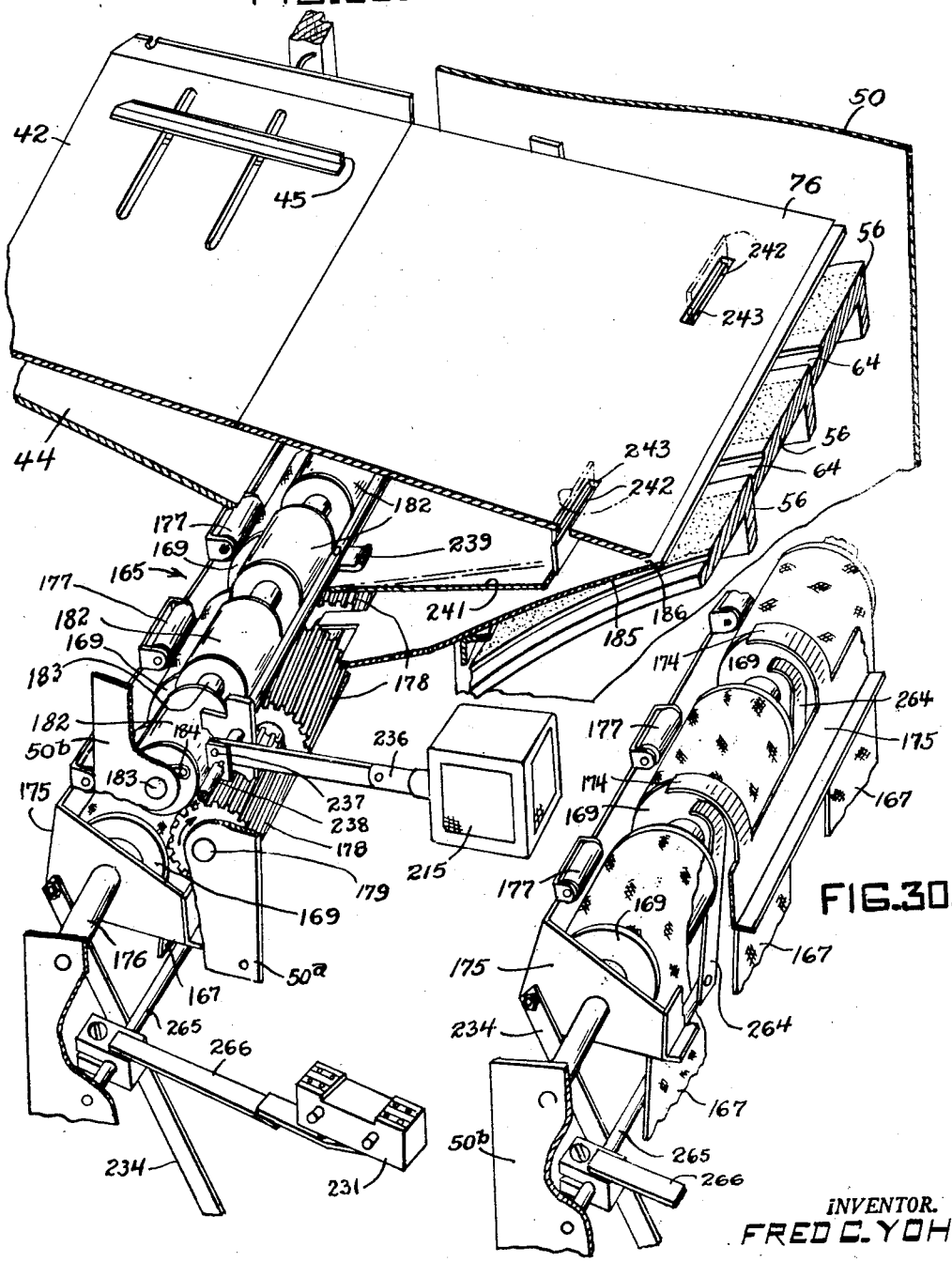

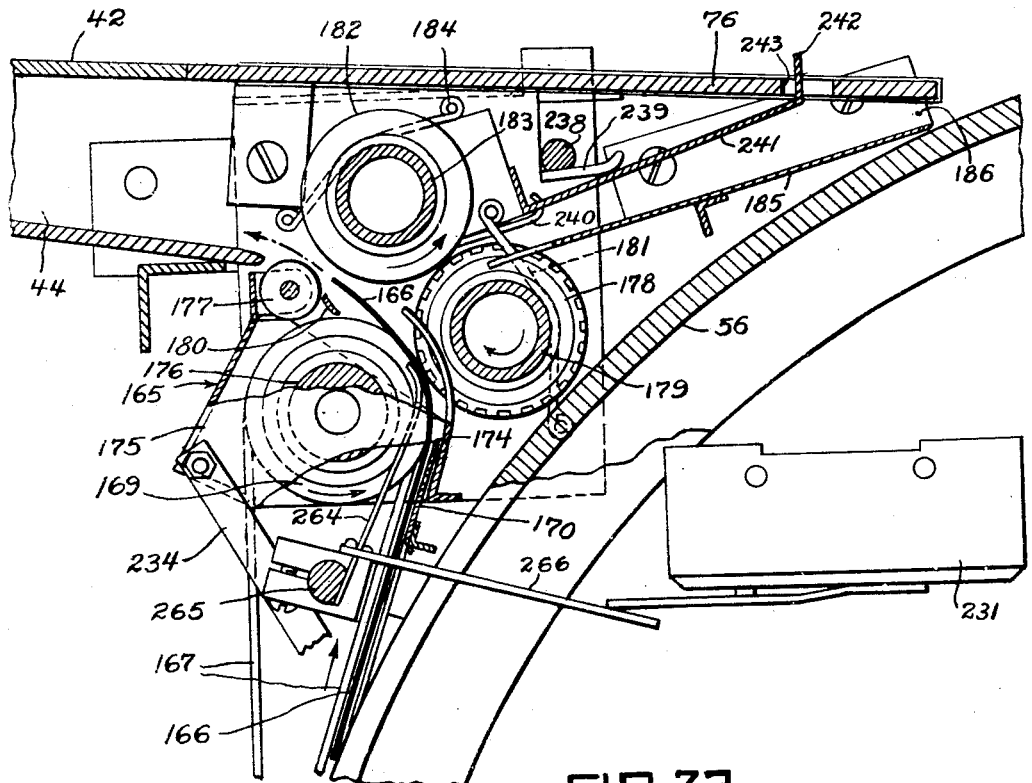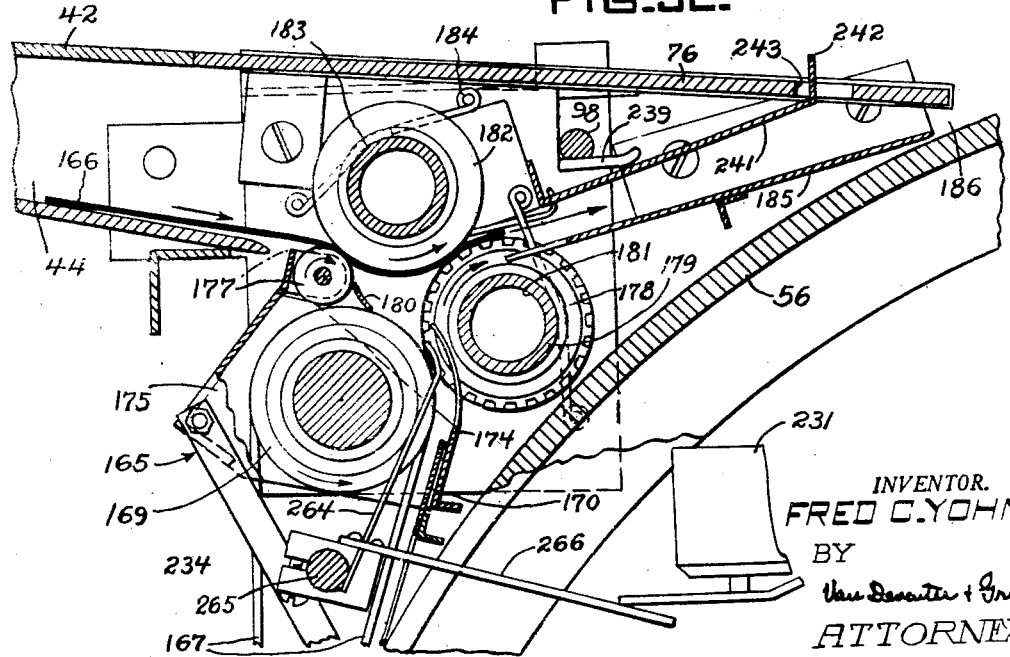

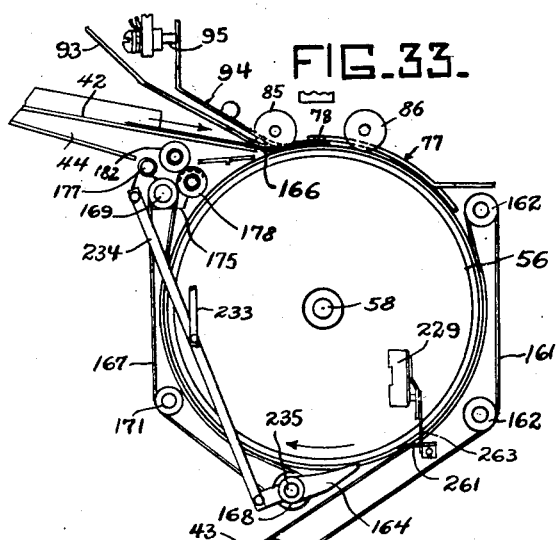
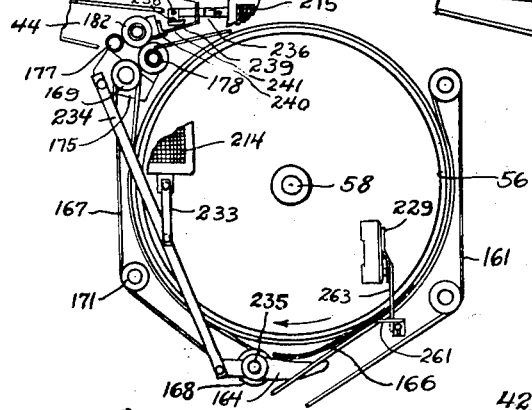
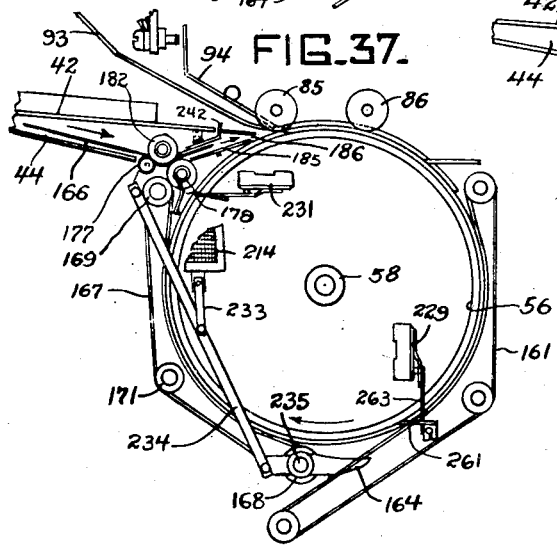
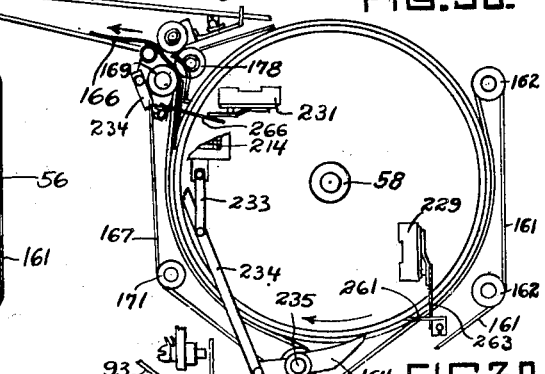
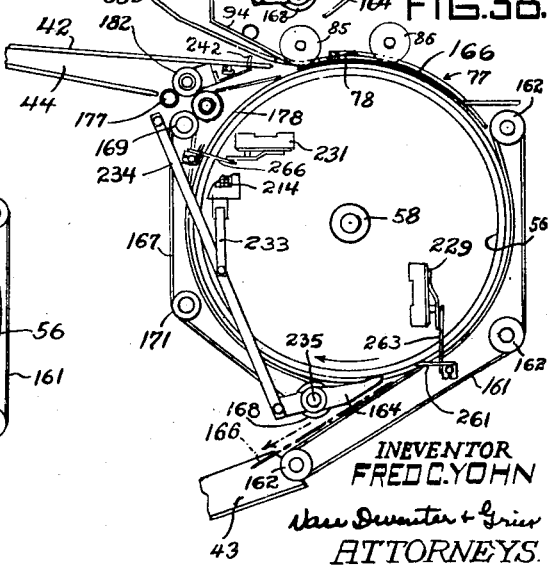

June 14, 1949. F. C. YOHN 2,472,931
FLOW CAMERA DOCUMENT-COPYING MACHINES
Filed Jan. 11, 1945 24 Sheets-Sheet 18

INVENTOR.
FRED C. YOHN
BY Van Deventer + Grier
ATTORNEYS.

June 14, 1949. F. C. YOHN 2,472,931
FLOW CAMERA DOCUMENT-COPYING MACHINES
Filed Jan. 11, 1945 24 Sheets-Sheet 21

INVENTOR.
FRED C. YOHN
ATTORNEYS.

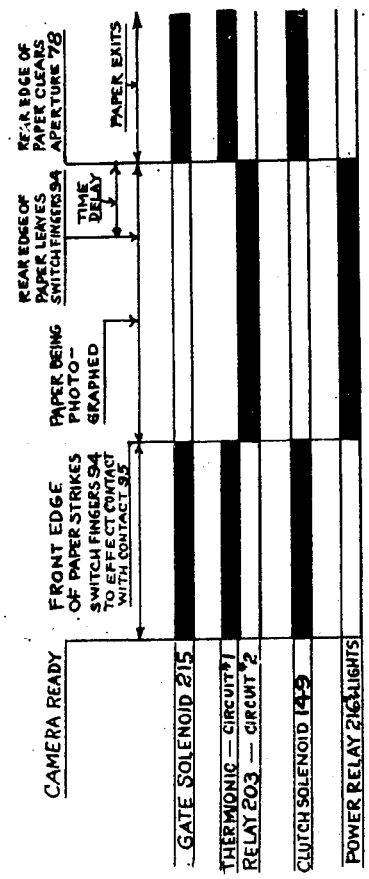

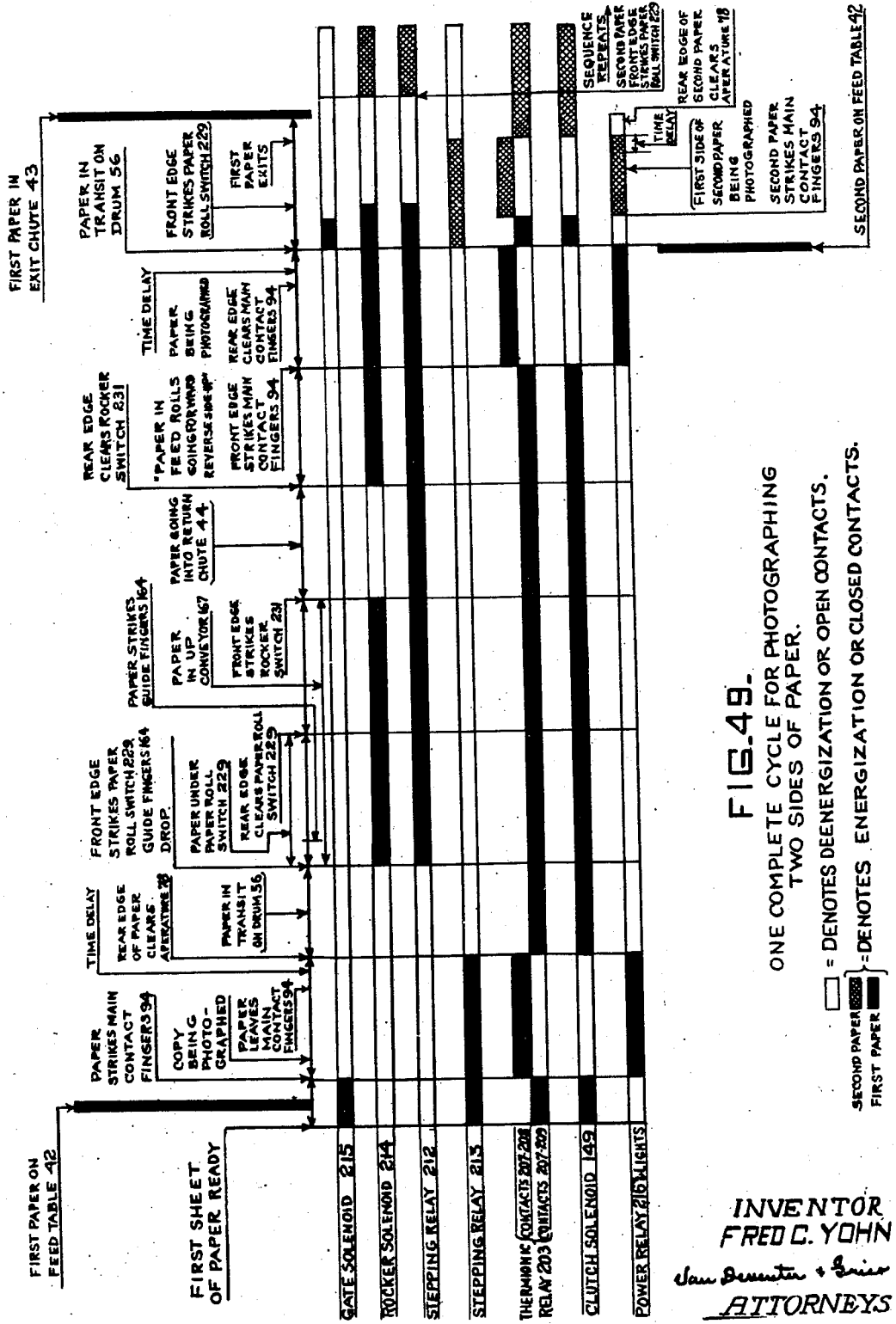

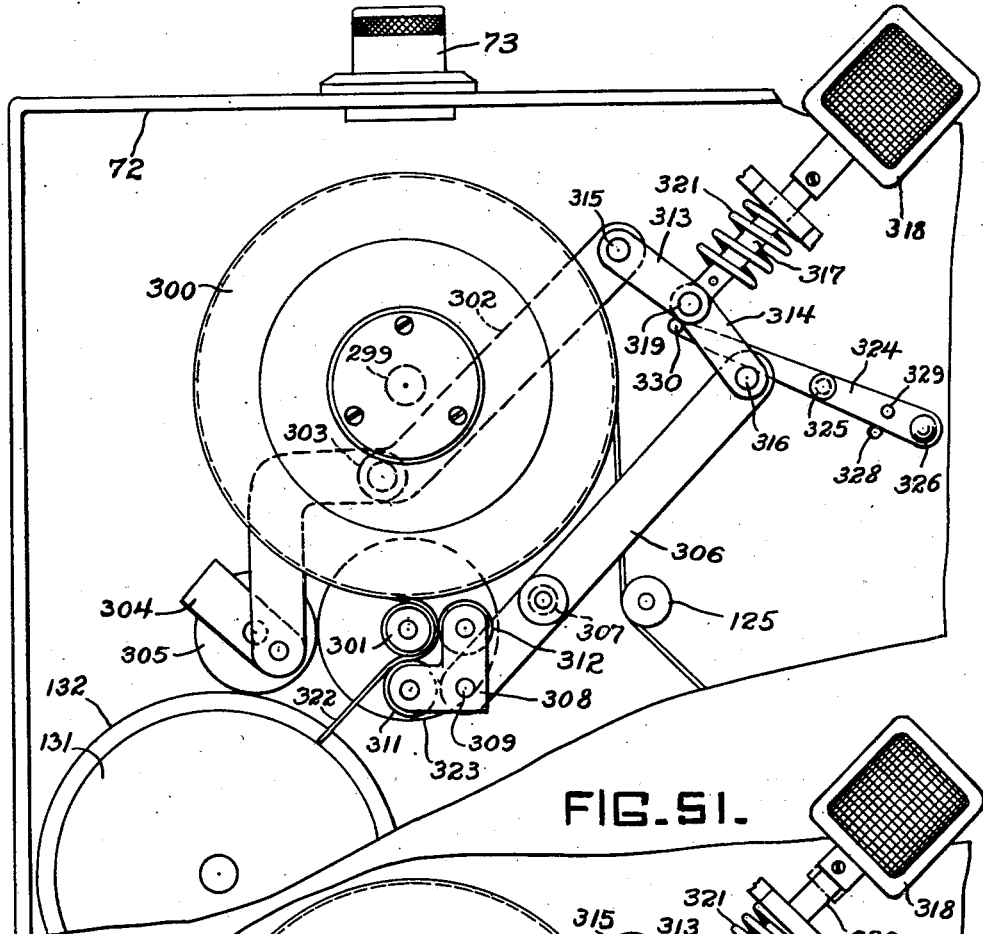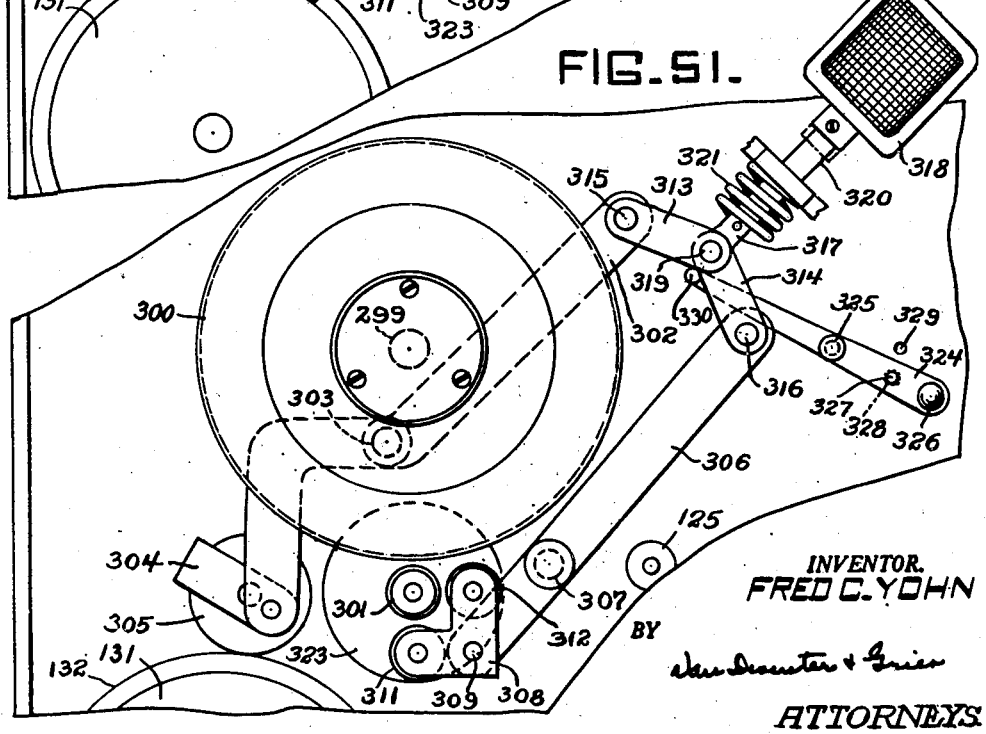

Patented June 14, 1949

2,472,931

UNITED STATES PATENT OFFICE 2,472,931

FLOW CAMERA DOCUMENT-COPYING MACHINE

Fred C. Yohn, Norwalk, Conn., assignor to Microstat Corporation, a corporation of Delaware Application January 11, 1945, Serial No. 572,264

25 Claims. (Cl. 88—24)

This invention relates to inprovements in flow cameras for photographing records, documents, maps and the like, and particularly to apparatus for and methods of photographing such records on microfilm in a continuous manner in the sequence in which the records are inserted in the machine. Such apparatus is commonly referred to as a "flow camera." In addition, the invention relates to apparatus for and methods of photographing both sides of documents, if and when this is desirable, and includes a selective document reversing mechanism which, when operated, causes a photograph of both sides of the document to be reproduced one after the other on the microfilm.

It is an object of the invention to provide an improved, compact and inexpensive flow camera apparatus for photographing records on microfilm.

One of the difficulties heretofore encountered in machines of this type is that the photograph on the microfilm is not clear. The reason for blurred pictures is that the photograph, being so much reduced in size from the original, shows any accidental variation in the ratio of the speed of the paper with respect to the film greatly out of proportion to the slight variation that occurs. In prior machines, with which I am familiar, there were a large number of places in the machine where one part did not always move in the same path or in the same ratio to another part of the machine. In the present machine there are only two places where slippage could possibly occur, and these two places have been so designed that any change in the ratio of the paper speed and the film speed is virtually eliminated, thus ensuring clear unblurred photographs on the microfilm.

It is, therefore, a further object of the invention to produce clear and unblurred microfilm photographs of the documents placed in the machine.

It is another object of the invention to provide an improved drive mechanism for the microfilm and the moving drum or roller on which the documents are photographed, so that the proper ratio of movement is maintained, and aberrations, striations and blurs on the photograph thus taken are substantially eliminated.

It is still another object of the invention to provide a novel drive for the drum which carries the documents to be photographed into and out of the machine and past the aperture through which the document is photographed.

It is a further object of the invention to provide a novel electrical and mechanical control system for effecting the sequence of operations of the machine which are required to photograph such documents on a moving film, and further to provide suitable control apparatus for selectively photographing one side or both sides of documents on the microfilm.

It is another object of the invention to provide an improved method of photographing documents on one or both sides, and also to provide a novel method for controlling the sequence of operations of a flow camera.

It is also an object of the invention to provide a novel interlock control mechanism on the camera which insures that unexposed film is presented for exposure when the machine is started, and to also ensure that the exposed film containing photographs of the documents is not exposed to the light when it is desired to open the camera case.

It is also an object of the invention to provide improved mechanism for feeding and taking up the film.

It is a further object of my invention to provide a new form of scanning slot for the documents, so that creased or dog-eared documents will pass freely under the scanning slot without irregular movement or jamming, so that a clear exposure is obtained. Furthermore, an improved drum and drive therefor is provided to prevent jamming of such documents when passing through the machine.

It is an ancillary object of the invention to provide an improved feeding and ejecting mechanism for the documents to be photographed.

It is again an object of the invention to provide a novel and compact cabinet structure for the photographic apparatus.

It is also an object of the invention to provide a novel and rigid support for the mirrors and lights of the photographic apparatus.

These and other objects of the invention will be apparent from the following description and drawings, wherein:

Figure 1 is a perspective view of the cabinet which houses the photographing machinery, as it appears when not in use;

Figure 2 is a perspective view of the front of the cabinet as it appears when the photographing machinery is in use;

Figure 3 is a view of the rear of the cabinet shown in the position in which the photographing machinery may be removed for inspection or repair;

Figure 4 is an enlarged detail view of the belt tensioning device shown in Figure 3;

Figure 5 is a view of the removable panel for the rear of the cabinet;

Figure 6 is a sectional view through the machine and the cabinet, showing the feed table, return chute, and exit chute in their operating positions;

Figure 7 is an end elevation of the camera end of the photographing machine;

Figure 8 is an end elevation of the drive end of the photographing machine;

Figure 12 is a detail view of the mirror supporting structure, and illustrates the path of the light rays from the paper to the camera lens;

Figure 13 is a sectional view taken on line 13—13 of Figure 28;

Figure 14 is a fragmentary sectional view of the photographing aperture;

Figure 15 is a fragmentary plan view of the light tunnel and aperture plate;

Figure 16 is a diagrammatic sectional view of the light tunnel and aperture plate taken on line 16—16 of Figure 15;

Figure 17 is a detailed view of the camera, film box and clutch mechanism for driving the film;

Figure 18 is a detailed view of the film drive mechanism shown in position for loading or unloading film;

Figure 19 is a horizontal sectional view of the film drive mechanism;

Figure 20 is a detailed view of the handles and bumper on the door of the camera box, showing the handle in the loading or unloading position;

Figure 21 is a vertical sectional view of the camera box;

Figure 22 is an exploded perspective view of a portion of the drive mechanism;

Figure 23 is an enlarged top plan view of the handle and cam mechanism;

Figures 24, 25 and 26 are diagrammatic views showing the various positions of the film driving mechanism; Figure 24 illustrating the driving position, Figure 25 the declutched position and Figure 26 the loading and unloading position;

Figure 27 is a broken view of the front of the machine with parts broken away particularly to illustrate the paper reversing mechanism;

Figure 29 is a perspective view of the paper reversing mechanism and paper gates with parts broken away for clearness;

Figure 30 is a perspective view of a portion of the paper reversing mechanism;

Figure 31 is an enlarged view, taken on line 31—31 of Figure 27, of the paper reversing mechanism shown at the time the paper has just entered the mechanism;

Figure 32 is an enlarged view, taken on line 31—31 of Figure 27, of the paper reversing mechanism shown in position for returning the reversed paper;

Figures 33 and 34 are diagrammatic views of the paper roll showing the paper entering the photographing aperture and passing the deflecting fingers, respectively, thus illustrating the path of the paper when being photographed on one side;

Figure 39:
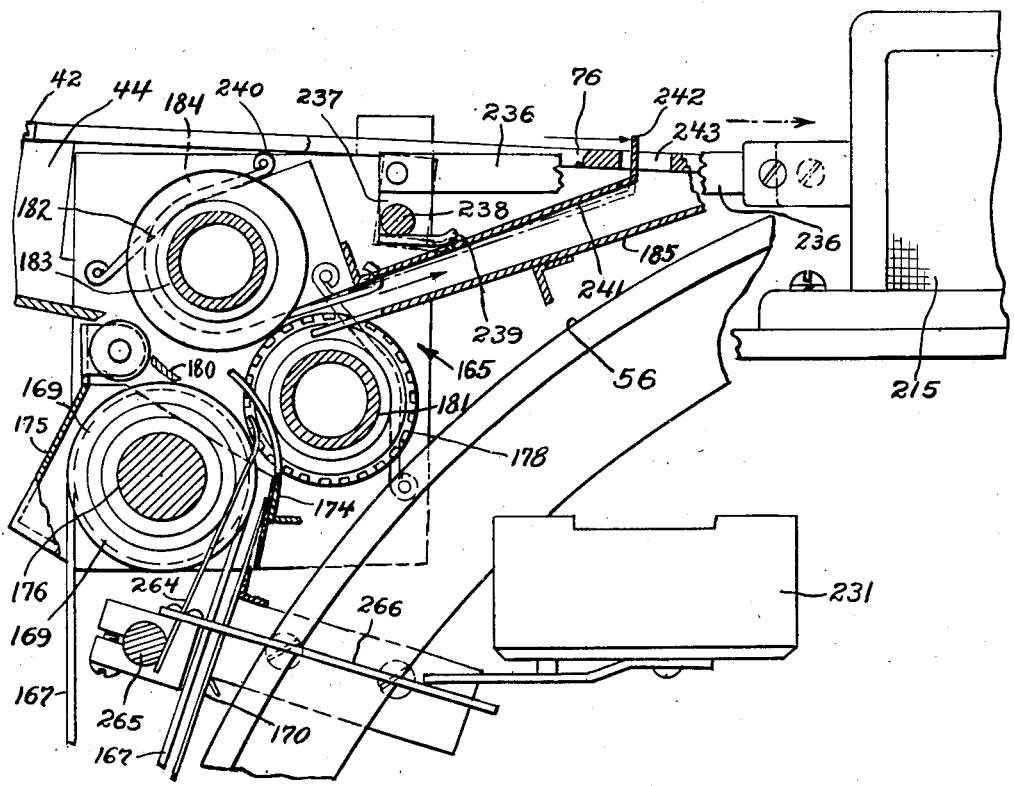
Figure 40:
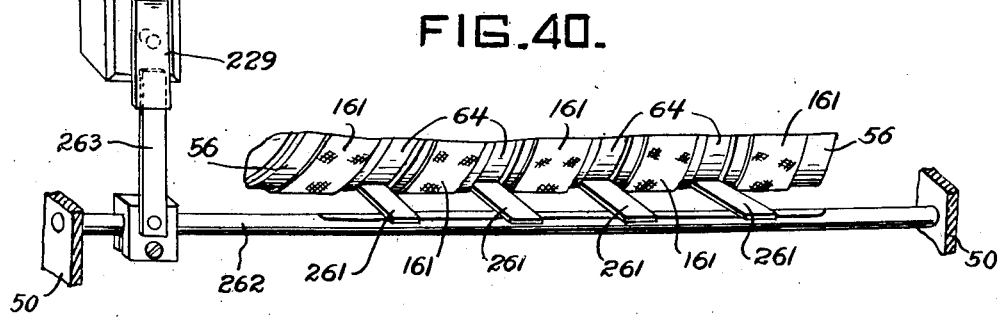
Figure 41:
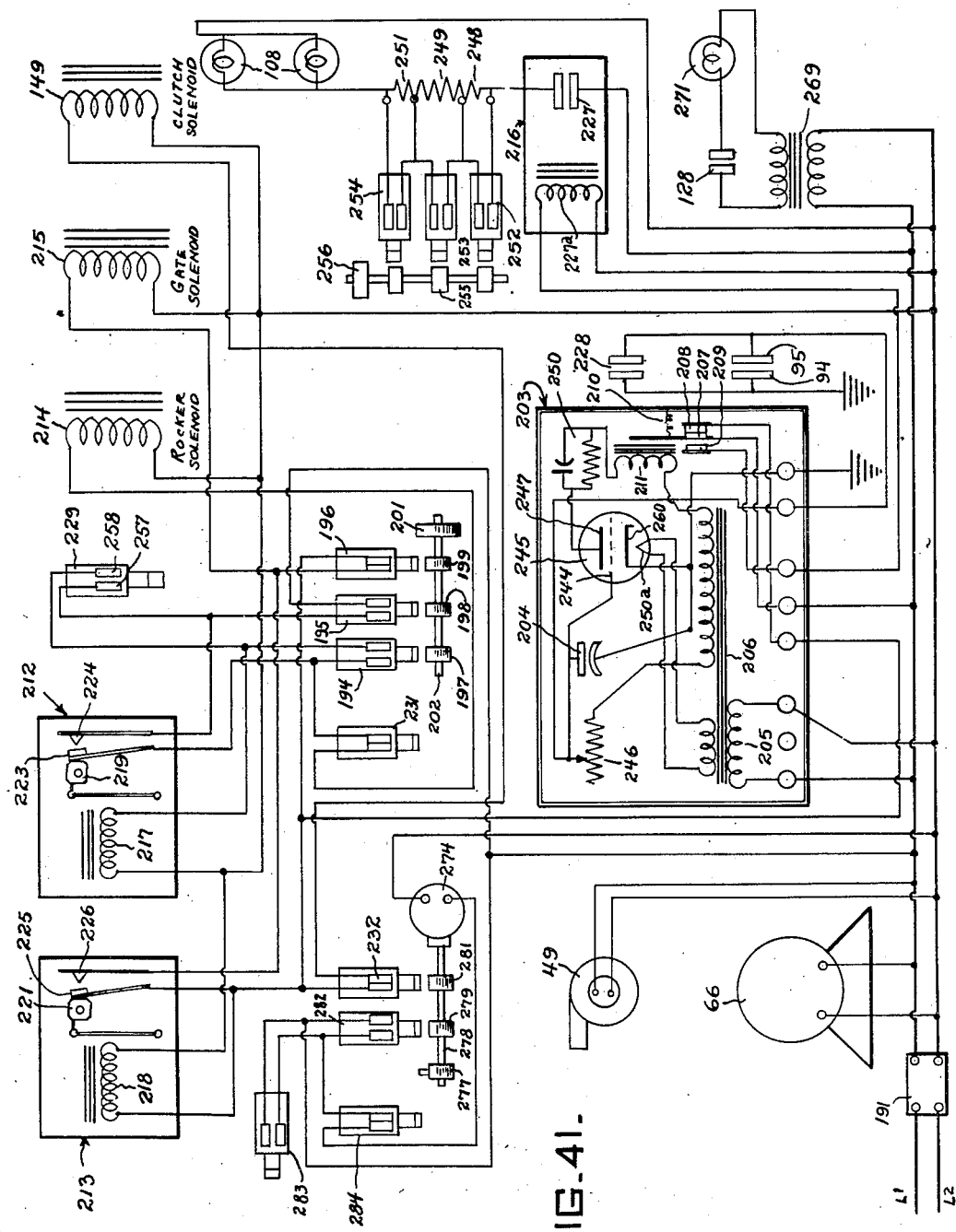
Figure 42:
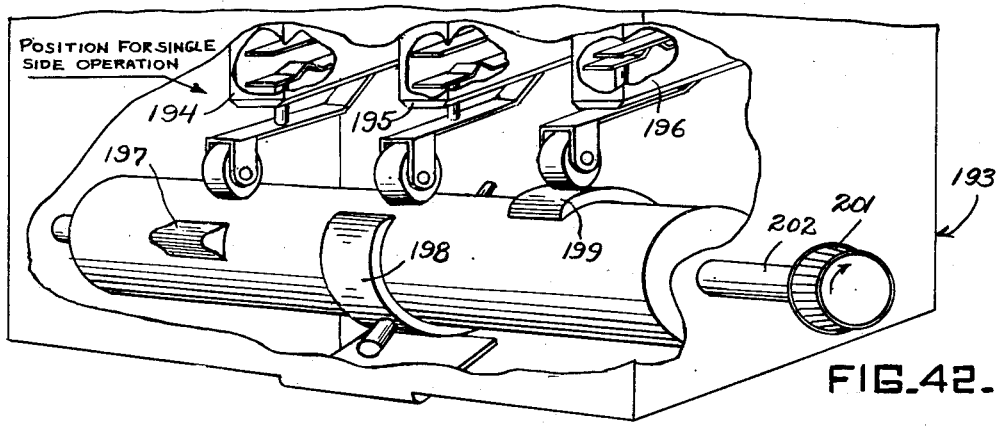
Figure 43:
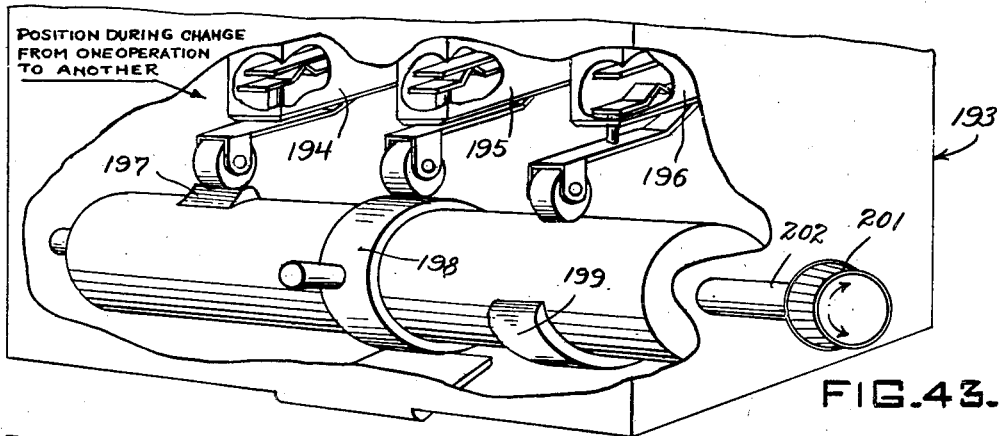
Figure 44:
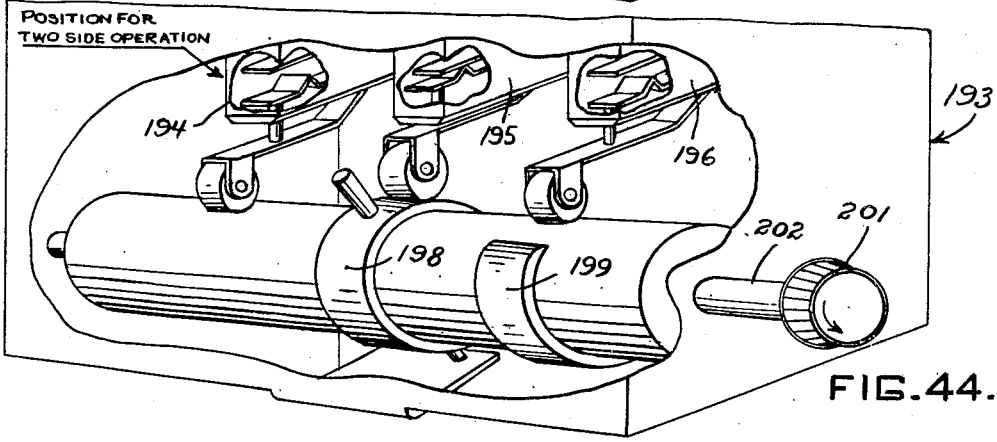
Figure 45:
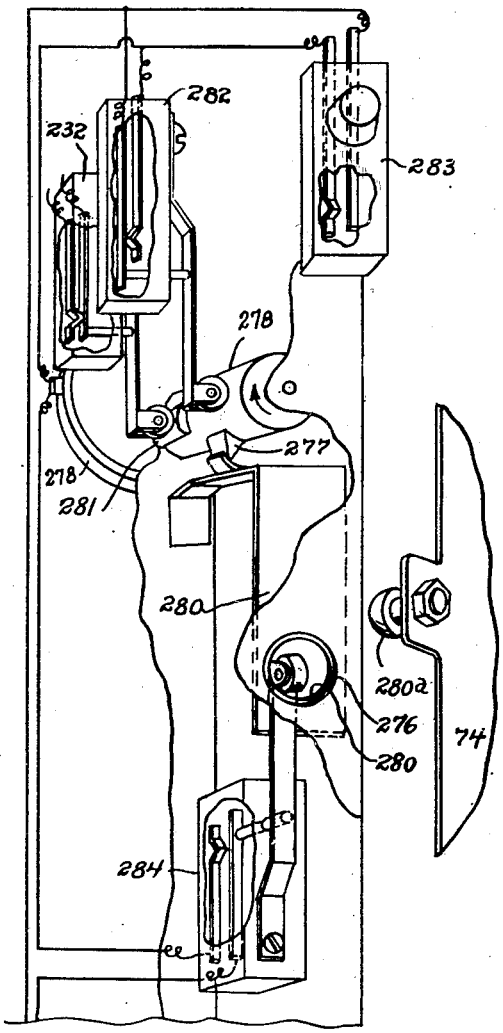
Figure 46:
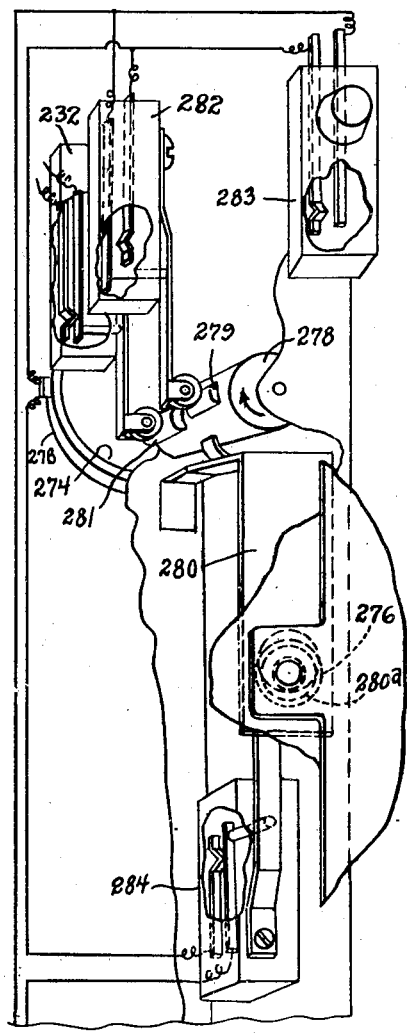
Figure 46A:
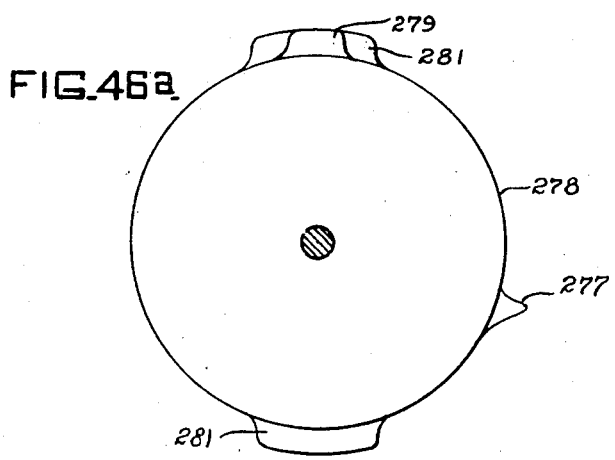
Figure 47:
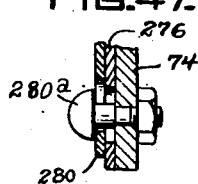

Figures 35 to 38, inclusive, together with Figure 33, are diagrammatic views showing the path of the paper when being photographed on both sides;

Figure 39 is an enlarged view of the paper gate mechanism;

Figure 40 is an enlarged fragmentary view of the rocker microswitch and contacts shown in their position with respect to the paper roll;

Figure 41 is a wiring diagram of the apparatus;

Figures 42, 43 and 44 are views of the panel cam switches shown in their various positions;

Figures 45 and 46 are diagrammatic views of the cam switches and cam latch for the camera box interlock showing the camera box door in the open and closed positions;

Figure 46a is a view of the cam arrangement for the switches and latch of the interlock system;

Figure 47 is a view of the door and the small switch closed by the door;

Figure 48 is a chart showing the sequence of operations when one side of the paper is being photographed;

Figure 49 is a chart showing the sequence of operations when both sides of the paper are being photographed;

Figure 50 is a diagrammatic view of a second embodiment of the film drive mechanism shown in the driving position; and Figure 51 is a view similar to Figure 50 showing the film drive mechanism in the released position.

Referring to the drawings for a detailed description of the invention, and more particularly to Figures 1 to 6, inclusive, numeral 40 designates generally a cabinet, and numeral 41 designates generally a photographing machine which is removably disposed in the cabinet 40. As shown in Figures 2 and 6, the cabinet 40 is provided with a feed table 42 and an exit chute 43, both of which are hinged so that they may be closed, as shown in Figure 1. Therefore, less space is occupied when the machine is not in use. The feed table 42 is provided with a return chute 44 beneath the feed table, which will be described more in detail hereinafter, and with a laterally slidable guide 45 which is adjustable for different size papers, so as to approximately center them.

The front of the cabinet is also provided with suitable control knobs and lights, referred to by specific numerals hereinafter, which are concealed behind the feed table 42 when it is closed, as shown in Figure 1.

As shown in Figures 1 and 3, the cabinet 40 is provided with a hinged top 46 and a removable rear panel 47. When the top 46 is swung back and the panel 47 is removed, the entire photographing machine 41 may be slid horizontally out of the cabinet. A suitable detachable electric socket 48 is provided so that the electrical connections between the cabinet and the machine may be easily detached. A blower and driving motor, indicated by numeral 49, is disposed in the top 46 of the cabinet to remove the heated air from the lamps, motors, et cetera, from within the cabinet and force it through a duct 51 to the exterior of the cabinet.

Referring now to Figures 3, 4 and 6 to 16, inclusive, the machine comprises a metal base 52 on which are supported side plates 50 and various angle iron structural members 53 which support various parts of the machine. These parts are very rigidly connected together to support mirror mounting angles 54, 54¹ bearings 55 for a rotating paper roll or drum 56 and a camera box 72. These parts are designed to prevent blurred pictures because of any undesired movement between the parts of the machine between which the image is transmitted.

Figure 11:
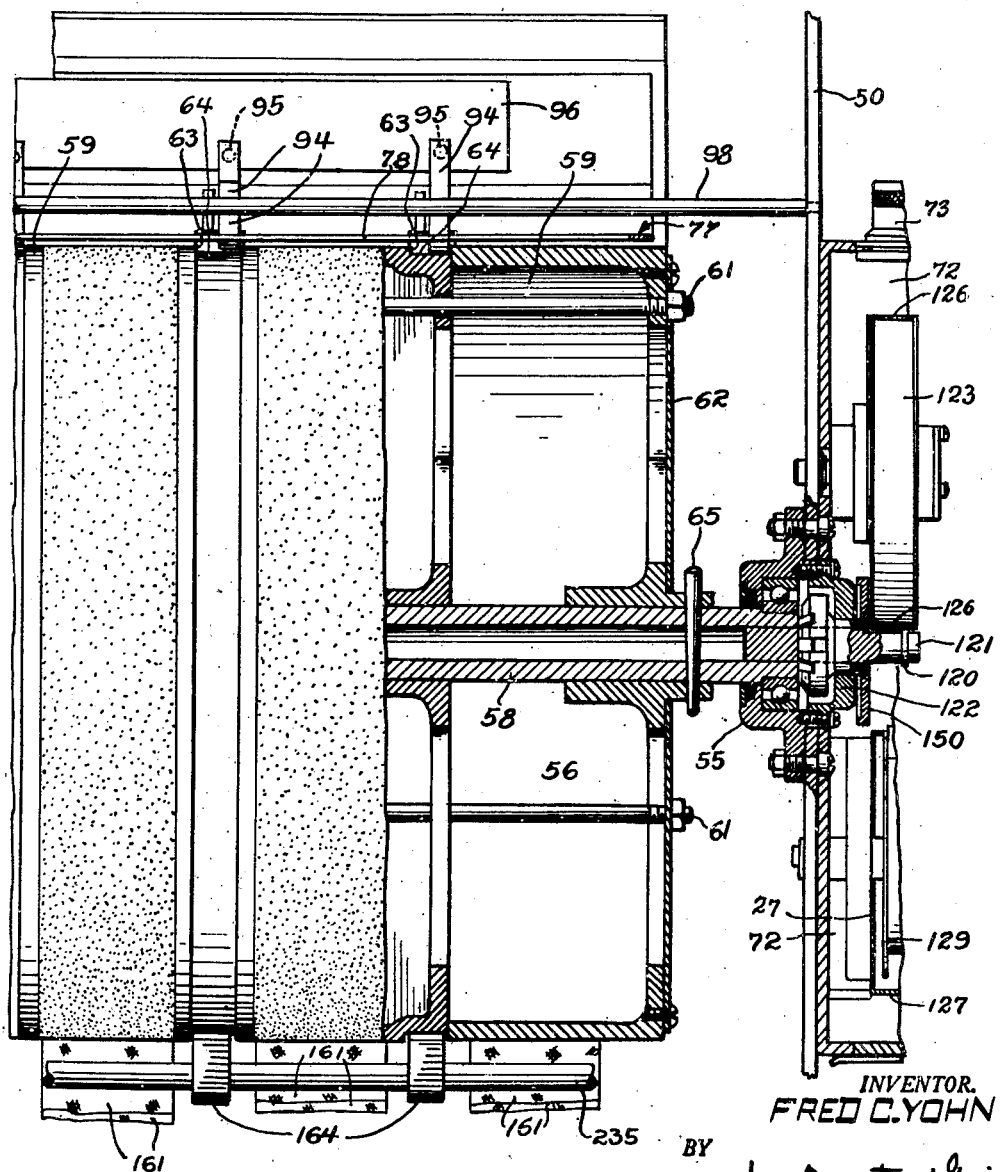
Figure 11 is a partial sectional view of the machine and paper roll.

As best shown in Figure 11, a main shaft 58 for the paper roll 56 is journalled in the bearings 55 supported by the side plates 50 and the paper roll 56 is formed of a plurality of hollow cylindrical sections 59 which are slid onto the shaft and held together by tie rods 61. End plates 62 are provided on the roll and each section 59 is provided with a shoulder 63 which form therebetween a plurality of grooves 64 in the paper roll 56. These grooves provide spaces for contact fingers and paper retaining and stripping members, as is explained hereinafter. A tapered pin 65 at the end of the shaft couples the cylindrical sections 59 to the shaft 58.

The paper roll 56 is preferably covered with rubber, although other materials of high frictional coefficient may be used which will prevent the papers from slipping relative to the roll, particularly while passing under the photographing aperture.

A driving motor 66 and gear reduction unit 67 for the paper roll 56 are mounted on a floating bracket 68 so as to take up any slack in a belt 69 which is connected to a pulley 71 attached to the paper roll 56 for rotating the latter.

A camera box generally indicated at 72 is rigidly mounted on the frame and is provided with a lens 73 in its upper horizontal surface, which lens collects light rays and projects them on a film contained in the camera box. If desirable, a suitable shutter (not shown) may be provided to prevent light from passing through the lens to the film when not photographing.

The camera box 72 is provided with a door 74 which is locked by an electric interlock system generally indicated at 75. The interlock system is more fully described hereinafter. Access to the camera box 72 and door 74 is provided through a door in the side of the cabinet 40 (not shown).

Figure 9:
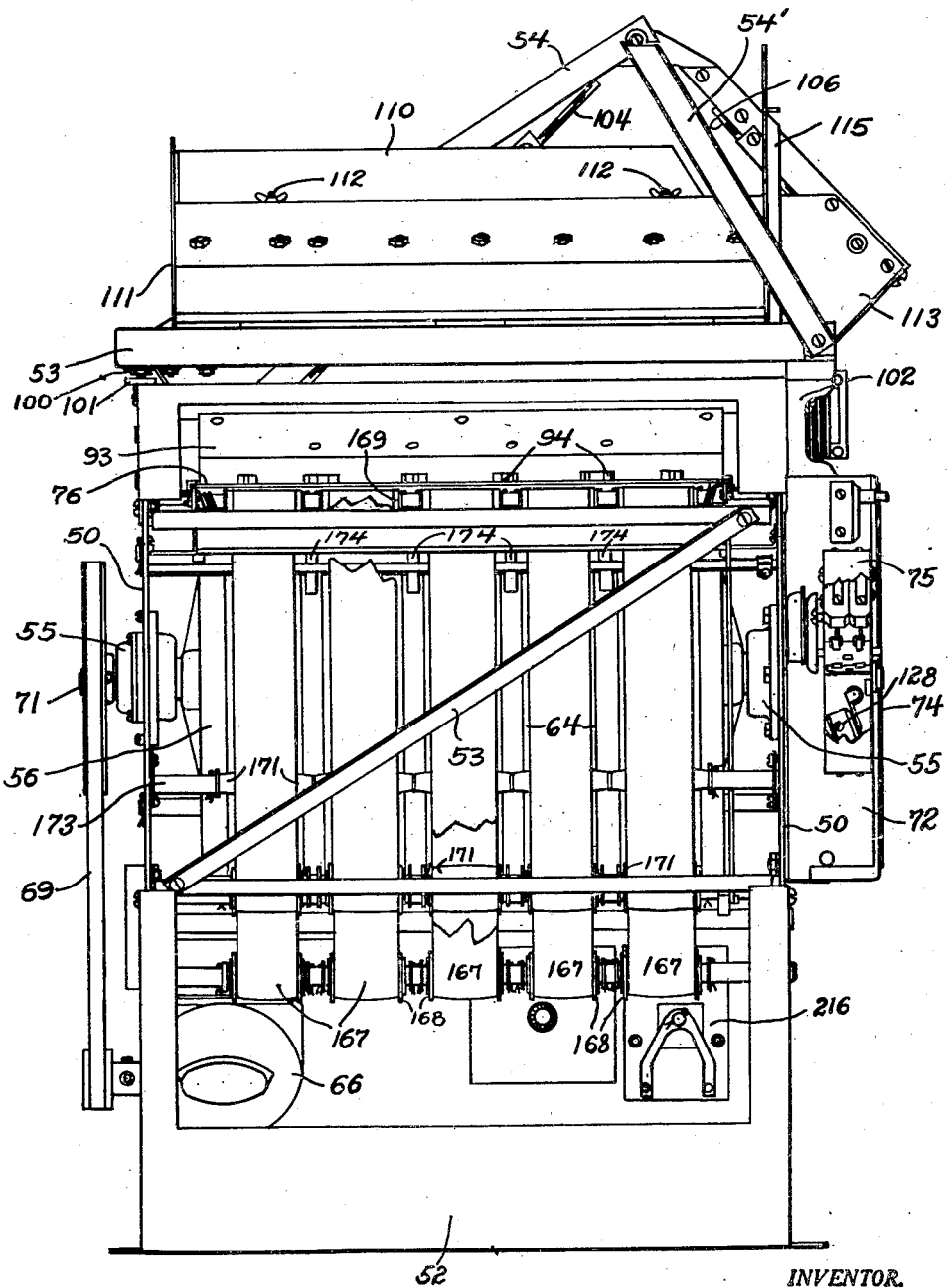
Figure 9 is a front elevation of the photographing machine with certain parts broken away.
Figure 10:
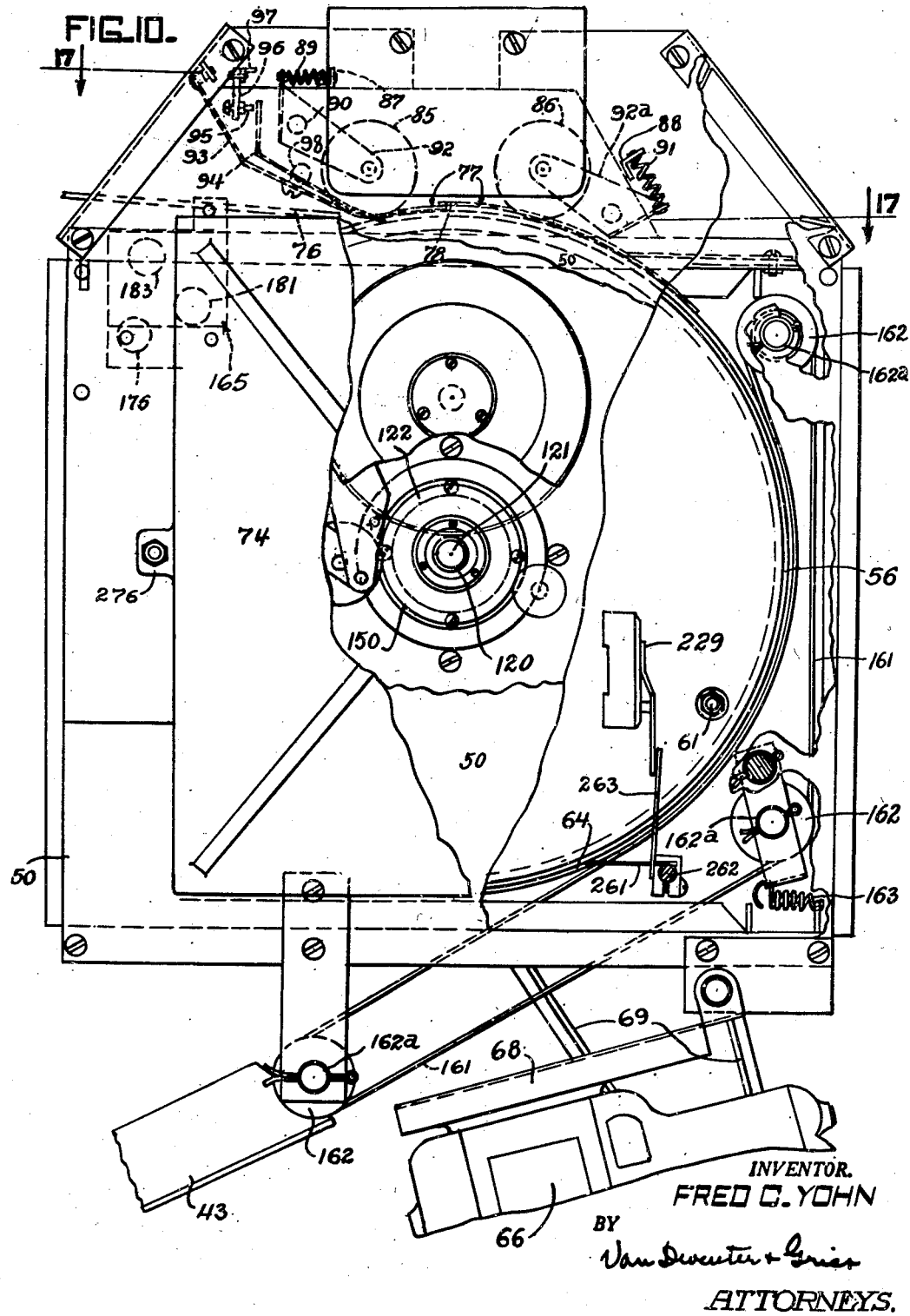
Figure 10 is an enlarged fragmentary view of the camera end of the machine with parts thereof broken away for clearness.

Mounted above the paper roll 56 is a paper feed plate 76 (Figure 6) which is in alignment with the top of the feed table 42 and which guides the paper to the paper roll 56 when the paper is originally inserted in the machine. A plate 77 containing a scanning aperture 78 through which the documents are photographed is disposed slightly above the paper roll 56 and is spaced from the feed plate 76 to form an opening 79 through which the paper passes when being fed from the feed plate 76 to the paper roll 56. As shown in Figures 13 and 14, the guide or aperture plate 77 is formed in two parts 81 and 82, both of which are provided with a plurality of openings 83 and 84, respectively. Spring pressed rolls 85 and 86, twelve in number in sets of two, project through the openings 83 and 84 to press the paper against the paper roll 56 to ensure that no slippage of the paper occurs in its travel past the photographing aperture 78. As shown in Figures 6, 10 and 13, angle pieces 87 and 88 attached to the side members 50 have individual springs 89 and 91 connected thereto for each set of rolls 85 and 86, which springs are connected to leverage members 92 and 92ᵃ pivoted on shafts 90 and 90ᵃ so that the rolls 85 and 86 are biassed toward the paper roll 56.

As best shown in Figures 13 to 16, inclusive, the scanning or photographing aperture 78 extends at a slight angle to the axis of the paper roll 56 and the rear edge of the aperture is slightly higher than the front edge. This construction ensures the free passage of creased or dog-eared papers without slippage or jamming. This is best shown in Figure 14.

As shown in Figures 6, 9, 10 and 13, a shield 93 is mounted above the feed plate 76 and conceals four paper contact fingers 94 and four contacts 95 which are mounted on an insulating block 96. The insulating block 96 is mounted on an angle piece 97 supported by the side walls 50. The contact fingers 94 are pivoted on a shaft 98, as best shown in Figures 6 and 10, and extend into the grooves 63 in the paper roll 56 to ensure movement of the contact fingers by the paper as it is conveyed by the paper roll 56.

The mirror mounting angles 54 are adjustably mounted above the aperture plate 77 by means of two bolts 99 at one end and one bolt 100 provided with an adjustment 101 at the other end, as best shown in Figures 7, 8 and 12. The fixed bolts 99 are secured to castings 102, 103, which are mounted on top of the camera box 72 and the adjustable support 101 rests on a cross angle member 53. A rigid three point support is thus provided for the mirrors. The adjustable support changes the position of both mirrors simultaneously with respect to the scanning aperture, but the angle of the mirrors with respect to each other, which is exactly 90°, is not changed.

A long mirror 104 is mounted on a channel piece 105 and a short mirror 106 is mounted on a channel piece 107. The long mirror 104 extends over the photographing aperture 78 and reflects the light rays from the paper thereunder to the short mirror 106 which in turn transmits the rays to the lens 73 in the top of the camera box and thence to the film. The dot and dash lines in Figure 12 illustrate the path of the light rays, and the dotted lines diagrammatically illustrate incandescent lamps 108.

The incandescent lamps 108 are arranged on each side of the photographing aperture 78 in removable socket base plates 109 secured to housings 111 by wing nuts 112, so that the base plates 109 may be readily lifted off when the wing nuts are removed to renew lamps. This construction is best shown in Figure 6. Ventilating louvres 110 are provided in the top of the housings 111 and electric wires of sufficient length to permit removal of the housings are connected to the lamps 108. A bent beam 115 provides rigidity for the lamp housings 111 which are connected thereto to avoid dependence for the support of the lamp housings 11 from the mirror mount tripod legs 54.

A light tunnel indicated at 113ᵃ is formed by two vertical sheets of metal 113 and 114 which extend from slightly above the photographing aperture 78 to a position adjacent the top of the mirrors 104, 106. The light tunnel prevents stray light from the lamps 108 from causing undesirable reflections. As shown in Figures 15 and 16, the bottom of the light tunnel 113ᵃ is provided with two flanges 116 and 117 which reduce the size of the opening to the light tunnel, and are formed to provide an opening at an angle to the axis of the paper roll which conforms to the angle of the photographing aperture 78. The result of this structure is to produce a sharper contrast in the shades of the photograph, because the light reflected from the aperture plate, which produces a gray image on the film, even though the plate is dead black, is considerably reduced. Furthermore, the space between the members 111 and 113 and 114 form a flue for heated air to prevent refractive index variation in the object space.

Referring now to Figures 17 to 26, inclusive, for a description of the driving and clutch mechanism for the microfilm, most of which is contained in camera box 72, numeral 121 designates a driving member or ratio arbor which is directly connected to or forms a continuation of the main shaft 58 of the paper drum 56, so that the driving member 121 rotates with the main shaft without any possible slippage. A bearing 122 attached to a side plate 50 supports the driving member 121. A large master film wheel 123 is driven by a land 120 on the driving member 121, which land pinches the film between itself and the master film wheel when in the driving position. The master film wheel 123 is preferably covered with soft rubber or similar material to prevent any slippage between the driving member and the film as the film passes the lens 73. The land 120 contacts the film at one edge thereof and ensures that no slippage occurs.

The ratio of the diameters of the paper roll 56 and the driving member land 120 is equal to the photographic reduction ratio, thus maintaining the proper ratio of movement between the paper being photographed and the film, as long as no slippage occurs. As stated before, slippage is eliminated in this machine. Because the driving member land 120 provides a small contact area and the master film wheel 123 is urged toward the driving member land 120 by a strong spring, as hereinafter described, a very high contact pressure is maintained between the driving member land 120 and the surface of the master film wheel 123 with the film therebetween.

Two rollers 124 and 125 are provided so that film 126 leaves a film box 127, contacts roller 125, is carried around the master film wheel 123, between the land 120 on the driving member 121 and the master film wheel 123, over the roller 124 and thence to the film box 127. This is best illustrated in Figure 17. A switch 128 contacts the film on the master film wheel 123 for a purpose hereinafter described.

The removable film box 127 contains a reel 129 for fresh film and a reel 131 for exposed film which is driven by a take-up wheel 132 through a suitable coupling 133. Openings 134 and 135 are provided in the top of the film box 127 for entrance and exit of the film. As best shown in Figures 17 and 21, the film box is held in position and coupled to the take-up wheel 132 by a spring bar 136 attached to the sides of the camera box 127 and provided with a rotatable cam 136a to which is attached a handle 137. This handle is shown dotted in the open position in Figure 21. Suitable register pins 130 are secured in the camera box in such position that the cam 136a forces the film box 127 into contact therewith when the handle 137 is in the upright position. The film box 127 is formed in two readily separable parts (not shown) so that film may be easily loaded or unloaded on said reels 129 and 131.

The master film wheel 123 is movable out of contact with the drive member 121 in the following manner. A fixed pintle 138 is secured to the back of the camera box 127 and is provided with bearings 139 for a cam member 141. The cam member 141 is threaded at 140 to retain the bearings 139 and is provided with a second pintle 142 which is off center with respect to the pintle 138. A bored hole 138a in the cam member 141 receives the fixed pintle 138 and its bearings. A boss 143 is provided at the front of the cam member 141 which is engaged by, or connected to, a leverage member 144. The master film wheel 123 rotates about the second pintle 142 on bearings 145. It is obvious, therefore, that when the leverage member 144 is moved downwardly that the film wheel 123 is moved upwardly a small distance about the fixed pintle 138 as a pivot point, thus disengaging film from contact with the driving member 121 and stopping the movement of film.

When film is being moved, the take-up roll 132 is driven by a take-up wheel 146, which in turn is driven by a second driving member or ratio arbor 150 attached to the driving member 121, and also driven by the main shaft 58. The take-up wheel 146 is attached to a leverage member 147 which is movable about a fixed pivot 148 into and out of engagement simultaneously with the take-up roll 132 and with the wheel 150 attached to the driving member 121. The take-up wheel 146 is rotatably mounted on a bracket 146a which is pivoted at 147a. It is to be noted that the pivot point 147a is spaced at an angle to and below the center of rotation of the take-up wheel 146.

Both the leverage member 144 for the large film wheel 123 and the leverage member 147 for the take-up wheel 146 are moved simultaneously, either by energizing and de-energizing a solenoid 149 in response to the movement of paper through the machine in a manner hereinafter described, or manually by means of a cam 151 to which is attached an operating handle 152.

The leverage member 144 is biased toward the driving position by spring 159, and is held out of the driving position by energizing the solenoid 149. The spring 159, therefore, provides high contact pressure between the driving member land 120 and the film. The leverage member 147 is biased toward the driving position by the spring 160 and is held out of driving position by the energization of the same solenoid 149.

When in the driving position, the film take-up wheel 146 is rotated in a counterclockwise direction and the film take-up roll 132 in a clockwise direction. As the film on the take-up reel 131 increases in diameter, the reel, if rotated the same distance, would tend to take up more film than is being fed by the driving member 121. Therefore, as film is built up, the reel pulls against the film and increases the force necessary to turn the take-up roll 132. This in turn causes the take-up wheel 146 to skid with respect to the take-up roll 132. Because of the position of the pivot points 147a and 148 with respect to the center of rotation of the take-up wheel 146, and because of the counterclockwise rotation of the take-up wheel 146, the skidding tends to turn the leverage member 147 against the bias of the spring 160 to permit the take-up wheel 146 to skid more easily.

When the solenoid 149 is energized, as shown in Figure 25, the master film wheel 123 is out of engagement with the driving member 121 and take-up wheel 146 is out of engagement with the wheel or second driving member 150 and with the take-up roll 132. The solenoid 149 is provided with an operating arm 153 which is connected to a double lobed cam member 154, one lobe of which is a roller 155. The cam member 154 rotates about a fixed pivot 156. The double lobed cam member 154 engages the film wheel leverage member 144 and the take-up wheel leverage member 147 to move the master film wheel 123 out of engagement with the driving member 121 and to also move the take-up wheel 123 out of engagement with the second driving member 150 and the take-up roll 132, when the solenoid 149 is energized. When the solenoid 149 is de-energized, which occurs at the time when paper is inserted in the machine, as fully explained hereinafter, the parts assume the position shown in Figure 24 because of the bias of springs 159 and 160, and both the master film wheel 123 and the take-up roll 132 are moved by the first driving member 121 and second driving member 150, respectively.

When it is desired to load or unload film, the handle 152 is turned, thus turning cam 151, which engages both the leverage members 144 and 147 and places the parts in the position shown in Figure 26. Both the large film wheel 123 and the take-up wheel 146 are out of engagement with the driving member 121 and take-up roll 132, and a relatively large space is provided between the master film wheel 123 and the driving member 121 so that the film 127 may be easily threaded onto or removed from the mechanism in the camera box 72.

As best shown in Figure 20 the door 74 is provided with a bumper 157 which strikes the handle 152 when the cam 151 and handle 152 are in the film loading or unloading position, thus preventing closing of the door and operation of the electric interlock unless the film driving mechanism is conditioned to drive film.

Referring now to Figures 3, 4, 6, 9, 13, 27 and 28 for a description of the mechanism for conveying papers to be photographed through the machine, a plurality of belts 161, five being shown herein, are provided at the rear side of the paper roll 56. These belts are so spaced that they do not cover the grooves 64 in the paper roll 56 and are spring tensioned on pulleys 162 which rotate on shafts 162ᵃ by springs 163 connected to the frame of the machine (see Figure 10), so that the inside portion of the belts 161 always hug the paper roll 56 tightly. The intermediate shafts 162ᵃ are free to move laterally in their bearings to permit taking up of slack. If only one side of the paper is being photographed, the paper passes under the aperture 78, is held in non-slipping contact with the paper roll 56 by the spring pressed rolls 85 and 86, then passes between the belts 161 and paper roll 56 and is conveyed to the exit chute 43 (see Figure 6). The pulleys 162 are positioned to cause the paper to be delivered to the exit chute, and a set of deflectors 164 are normally within the grooves 64 of the paper drum 56 to direct the paper into said exit chute. If both sides of the paper are to be photographed, the paper continues on around the paper roll 56 once more in a manner to be presently described and then is delivered to the exit chute 43 from the belts 161.

In order to photograph both sides of the paper automatically and sequentially, a reversing mechanism, generally indicated at 165, is provided, as illustrated best in Figures 6 and 27 to 38, inclusive. The paper designated as 166 is fed into the machine and passes the photographing aperture 78 to photograph one side of the paper. This position is shown diagrammatically in Figure 33 wherein the position of the paper is the same whether one or both sides are to be photographed. In photographing both sides, the paper deflecting fingers 164 drop below the paper roll in a manner hereinafter described (see Figure 28), stripping the paper from belts 161 and guiding it into belts 167 which carry the paper upwardly on the paper roll 56. This is shown diagrammatically in Figure 35.

As shown in Figures 6, 9, 27 and 28, the belts are held in contact with the paper roll 56 by a lower set of pulleys 168, an upper set of pulleys 169 and a tensioning set of pulleys 171 which are spring tensioned by springs 172. A shaft 173 on which the pulleys 171 are mounted is laterally movable a sufficient distance to permit the springs 172 to hold the belts 167 tightly against the paper roll 56.

The lower set of pulleys 168 so position the belt that the paper is picked up immediately upon leaving the paper deflecting fingers 164, and the upper set of pulleys 169 position the belt 167 so that the paper is conveyed into the paper reversing mechanism 165. This position of the paper is shown diagrammatically in Figures 31 and 36. As best shown in Figure 31, as the leading edge of the paper reaches approximately the upper pulley 169, it is directed by a doctor plate 170 and by deflector fingers 174 into the paper return chute 44, it being obvious that the side of the paper which has not been photographed is now uppermost. The deflector fingers 174 are positioned between the upper pulleys 169, as best shown in Figure 30, and are movable in a manner hereinafter described, so that the deflectors are close to the pulleys 169 when the paper is passing into the return chute 44 to direct the paper into the return chute, and are moved out of the way when paper is being fed out of the return chute, as shown in Figure 32.

A rocker 175 is pivoted on a shaft 176 supported by the end plate 50 and has attached thereto a number of small pincher rolls 177 and the deflectors 174. A small deflector plate 180 is positioned between the pincher rolls 177 and the upper pulleys 169.

The belts 167 contact a plurality of longitudinally fluted rolls 178 and rotate them in a clockwise direction when the machine is running. The fluted rolls 178 are journalled on a shaft 179 supported by the brackets 50ᵃ. The shaft 179 is a floating shaft and is biased into contact with the belts 167 by springs 181. A plurality of smooth rolls 182 journalled on a floating shaft 183 supported by brackets 50ᵇ are biased into contact with the fluted rolls 178 by springs 184. The smooth rolls 182 are therefore rotated in a counter-clockwise direction by the fluted rolls 178.

After the end of the paper has approximately passed the upper pulleys 169, the rocker 175 is rotated in a clockwise direction by means to be presently described, and the trailing edge of the paper is pinched between the pincher rolls 177 and the smooth rolls 182, thereby moving the paper out of the return chute 44 and toward the fluted rolls 178. The flutes then contact the leading edge of the paper and feed it between the rolls 178 and 182, the spring pressure being insufficient to prevent the entrance of the paper between the rolls. The deflector fingers 174 are moved out of the way between the fluted rolls 178 so that the paper will contact the flutes and not tend to be fed back toward the upper pulleys 169. This position of the rocker 175, rolls 177 and paper 166 is shown diagrammatically in Figures 32 and 37. The paper is then guided by a plate 185 back to the paper roll 56 through an aperture 186 between the plate 185 and the upper feed plate 76, whereupon the unphotographed side of the paper passes under the photographing aperture 78 and again contacts contact fingers 94 and closes contacts 95, so that an image of the latter side of the document is photographed on the microfilm in sequence with the photograph of the front side of the document. The document is then directed to the exit chute in the same manner as when one side of the paper is being photographed.

*Operation*

The sequence of operations is shown in Figures 48 and 49 and the wiring diagram for the electrical parts of the machine is shown in Figure 41.

The machine is started by closing a main switch 191, which energizes the driving motor 66 and blower motor 49, preferably from a 110 volt 60 cycle A. C. power source, designated at $L_1$, $L_2$. A manually operated control knob 192, shown in Figure 2, opens and closes the main switch 191. A panel cam switch 193 operates three switches 194, 195 and 196 by means of respective cams 197, 198 and 199, which are rotated by a hand knob 201 attached to a hand shaft 202. The hand knob 201 also extends through the front of the cabinet. Also included in the circuit is a thermionic relay 203 of standard design embodying a time delay condenser 204 and a primary coil 205 of an A. C. transformer 206, energized from the line $L_1$, $L_2$.

A movable contact 207 engages a fixed contact 208 in the relay 203, which contacts are normally in the closed position because of the bias of a spring 210. A second fixed contact 209 is provided and the movable contact 207 is moved into engagement therewith by a solenoid 211 when energized.

Also connected in the circuit are the following electrical devices: a first stepping relay 212, a second stepping relay 213, a rocker solenoid 214, a gate solenoid 215, a power relay 216 and the clutch solenoid 149. The stepping relays 212 and 213 are both of the same type and comprise a solenoid 217 and 218 operating stepping cams 219 and 221, respectively. The stepping relays are provided with respective contacts 223, 224, and contacts 225, 226. The relays 212 and 213 operate to break a circuit in one position and close a circuit in the other position of the respective cams 219 and 221 upon successive energization of the solenoid circuits. The power relay 216 comprises a solenoid 227ª which opens and closes a set of contacts 227 upon energization and de-energization thereof to supply current to the incandescent lamps 108.

Also included in the circuit are a hand operated film advance switch 228 having an operating button 230 on the front of the cabinet, a copy roll switch 229, the film alarm switch 128 and a rocker roll switch 231.

*Operation for photographing single side of documents*

First, it is assumed that the camera door 74 is closed and that the electric interlock system, to be hereinafter described, has conditioned the circuit for operation. If the panel cam switch 193 has been in the "single side" position, contacts 223, 224, of stepping relay 212 are in the open position, contacts 194 of the panel cam switch 193 are open, contacts 195 open and contacts 196 closed. However, if the panel cam switch is in the "two side" position, it is necessary to open the contacts 223, 224, of the stepping relay, open contacts 195 and close contacts 196. This is accomplished by turning the knob 201 and cams 194ª, 195ª and 196ª, which cams are so arranged, as shown in Figure 43 that contacts 194 make momentary contact before contacts 195 open, thereby energizing the solenoid of the stepping relay 212 and opening contacts 223, 224. As soon as contacts 223, 224 open, the solenoid circuit is dead and no further stepping may be accomplished. It is obvious therefore that if the contacts 223, 224 are already in the open position and contacts 194 and 195 are closed simultaneously, that the relay will not step; of course, it should not step, because it is in the desired position for single side operation when the contacts 223, 224 are open.

A contact 232 in the interlock system 75 is closed and contacts 207 and 208 of the thermionic relay 203 are closed by the bias of the spring 210.

Therefore, the rocker solenoid 214 cannot be energized because stepping relay 212 is open and gate solenoid 215 and clutch solenoid 149 are energized because contacts 207, 208 are closed.

Figure 28:
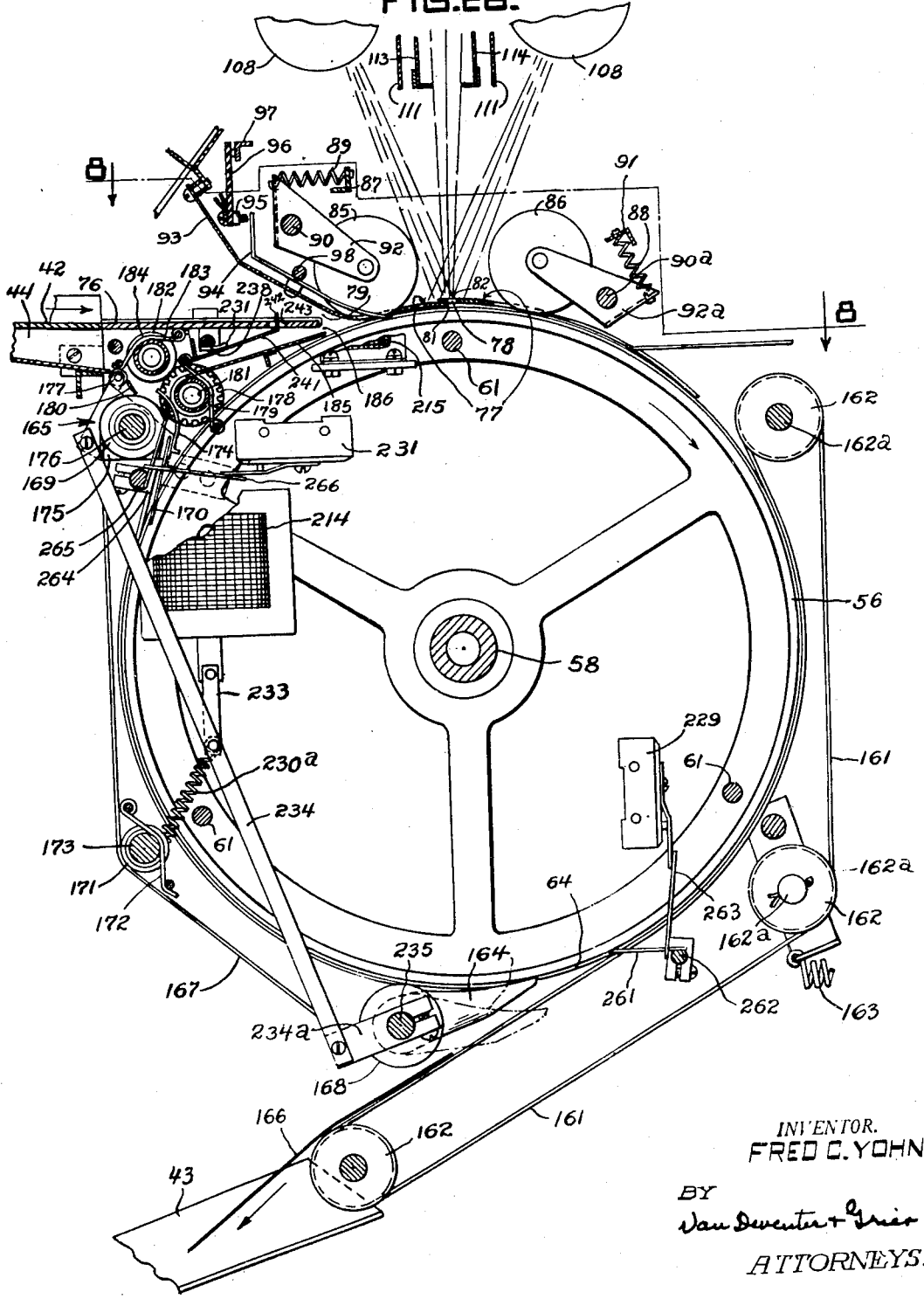
Figure 28 is a vertical sectional view of the machine also illustrating the paper reversing mechanism.

As best shown in Figure 28, the rocker solenoid 214 is connected by an operating member 233 to a tie rod 234 which is in turn pivotally connected to the return guide finger operating lever 234ª which operate the return guide fingers 164 at the bottom of the paper roll 56 and to the rotating bracket 175. As stated before, the pincher rolls 177 and deflecting fingers 174 are attached and move with the rotating bracket 175. The pincher rolls 177 are in the open position shown in Figure 31 when rocker solenoid 214 is de-energized because of the bias of a spring 233ª, although this is of no importance when only one side of the paper is being photographed. It is also to be noted that the return guide fingers 164 are mounted on a shaft 235 which also provides a shaft for the lower pulleys 168.

The rocker solenoid 214 is de-energized at this time and the return guide fingers 164 are held in the raised position in the grooves 64 of the paper roll 56 to thereby direct the paper into the exit chute 43.

As best shown in Figures 29 and 35, the gate solenoid 215 is connected by an operating member 236 to a crank member 237 secured to a shaft 238. A number of stiff members 239 serve to depress a plate 241 which is biased upward by springs 240 and is provided with gates 242 which extend through apertures 243 in the feed plate 76. When the gates 242 are in the raised position, insertion of paper into the machine is prevented (see dot-dash position in Figure 29). However, when the gate solenoid 215 is energized the members 239 depress the plate 241, thereby withdrawing the gates 242 to the position shown in solid lines in Figure 29, and paper is free to pass through the machine.

The clutch solenoid 149 is energized and, as explained hereinbefore, the film drive is therefore disengaged because the master film wheel 123 is in the raised position out of contact with the driving member 121. Furthermore, since the contacts 207 and 209 of the thermionic relay are open, the power relay 216 is not energized and no current, therefore, is being supplied to the lamps 108.

When paper is fed from the plate 42 and feed plate 76, it passes through the aperture 79, under the aperture plate 77 and aperture 78, and contacts one or more of the paper fingers 94 to close one or more main contacts 95. (See sequence of operation chart, Figure 48, and diagram in Figure 33.) When the contacts 94, 95 close, a circuit is established to the thermionic relay 203 which short circuits a grid 244 of a self-rectifying triode vacuum tube 245 and cuts out a variable resistance 246. This removes the negative bias from grid 244 of the tube and permits current to flow through a plate 247, a filter 250 and the solenoid coil 211, thereby operating the solenoid which opens contacts 207, 208 and closes contacts 207, 209. A heater 250a is also provided in the tube.

When contacts 207, 209 are closed, current is supplied to the power relay 216 which closes and permits current to flow to the incandescent lamps 108. The paper then passes under the photographing aperture 78 and the light rays are transmitted by the mirrors 104 and 106 to the lens 73 and thence to the film 126. A series of resistances 248, 249 and 251 are bridged by switches 252, 253 and 254, respectively, through the medium of a cam switch 255, which is operated manually by a knob 256 on the front of the cabinet, to cut in or out one or more of the sections 248, 249, 251. The brilliance of the lamps may thereby be regulated in accordance with the type of paper being photographed.

When contacts 207, 208 are opened by the action of the thermionic relay solenoid 211, the gate solenoid 215 and the clutch solenoid 149 are de-energized. The gates 242 are therefore raised by the action of the springs 240 so that further copy cannot be inserted in the machine. When the clutch solenoid is de-energized, the clutch springs 159 and 160 press the master film wheel 123 against the ratio arbor 121 and the take-up wheel 146 against the drive wheel 150 and take-up roll 132, thus transporting film 126 as the paper passes beneath the photographic aperture 78.

When the rear edge of the paper 166 clears the contact fingers 94, main contacts 95 are opened, thus removing the short circuit from the grid 244 of the vacuum tube 245. The circuit of the thermionic relay 203 is arranged in such a manner that it is self-rectifying, and operates directly from the alternating current. Thus normally during that half of the cycle when the plate end of the transformer is positive, the grid end is negative and this negative voltage biases the triode nearly to cut-off and the plate current is insufficient to operate the series relay 211. When the contacts 95 are closed, the grid 244 and a cathode 260 are short circuited and the grid bias thus removed. Under these conditions the plate current is large enough to operate the plate relay 211.

Upon opening the contacts 95 and removing the grid to cathode short circuit, the timing condenser 204 begins to charge, through the high resistance 246 from the transformer 206. This is due to the half cycle loading of the circuit by the rectifying action of the triode grid 244. The net effect is to shift dynamically the average potential on the grid to a negative value with respect to the cathode and thus bias the vacuum tube 245 to a low value of plate current.

The rate at which the differential voltage across the condenser 204 is obtained is proportional to the applied voltage received from the transformer, which in turn is inversely proportional to the resistance 246 in the circuit. Thus, it is apparent that a greater resistance causes a longer time to be consumed in building up the required negative charge on the grid end of the condenser. In the present device, the variable resistance 246 is set to give a time delay of about one tenth of a second during which time the rear edge of the paper clears the photographing aperture 78.

Contacts 207, 209 are then opened by the bias of the spring 210 and contacts 207, 208 are closed. The power relay 216 is deenergized, thus extinguishing the lights 108. The gate solenoid 215 and clutch solenoid 149 are energized, thus opening the gates 242 so that further copy may be inserted, and moving the master wheel 123 and take-up wheel 146 to stop film transport. The paper is carried around the paper drum 56 by the belts 161 and is deflected by the fingers 164 into the exit chute 43. This sequence is repeated each time a piece of paper is inserted in the machine. The flow chart, Figure 48, shows when the various devices are energized or deenergized, or have their contacts open or closed, at each stage of the cycle of operation.

*Operation for photographing both sides of documents*

When both sides of documents are to be photographed, the cam switch 193 is rotated to close contacts 195 and to open contacts 196 through movement of the cams 198 and 199 (see Fig. 44).

Contacts 194 are momentarily closed at the same time contacts 195 are closed when the shaft 202 is turned from "single side" position to "two side" position by the cam 197. This insures that the stepping relay 212 opens contacts 223, 224, in the same manner hereinbefore described. The closing of contacts 195 connects one contact 257 of the paper roll switch 229 to one side $L_1$ of the line so that stepping relay 212 will operate in response to opening and closing of the paper roll switch 229. Obviously, the other contact 258 of the paper roll switch 229 is connected to the other side $L_2$ of the line through solenoid coil 217 of stepping relay 212.

Also, when the paper 166 leaves the main contact fingers 74 and opens contacts 95, stepping relay 213 is opened, thus opening the circuit to the gate solenoid 215 and preventing the gates 242 from opening until stepping relay 213 is again closed later in the cycle.

The operation of the machine for photographing both sides of documents is the same otherwise as when one side of the paper is being photographed up to the time the paper strikes the paper roll switch 229, and a repetition of the sequence of operations up to this point is deemed unnecessary. Reference, however, is made to the diagrammatic views shown in Figures 33 and 35 of the drawings and to the sequence of operation chart in Figure 49. It is also to be noted that if the paper gates 242 are not open, momentary hand closing of the film advance switch 228 will operate the thermionic relay 203 and step the stepping relay 213 to the closed position to energize the gate solenoid 215 and open the gates 242. Attention is also directed to the fact that the gate solenoid 215 is now under control of the stepping relay 213, since contact 195 is closed and contact 196 is open.

When the paper 166 approaches the bottom of the paper roll 56, it strikes switch fingers 261 (see Figure 40) which are positioned in the grooves 64 of the paper roll and are attached to a rotatable shaft 262 journalled in the side walls 50. The shaft 262 rotates when the paper strikes the fingers 261 and closes the paper roll switch 229 through an extension 263 attached to the shaft 262. The switch 229 energizes the solenoid 217 of stepping relay 212 and closes contacts 223, 224, thus energizing the rocker solenoid 214 to drop the guide fingers 164. This permits the paper to be carried upward on the paper roll 56 by the turnover belts 167. When the paper 166 reaches fingers 264 adjacent and between the upper pulleys 169, it moves the fingers on a shaft 265 and opens the rocker switch 231 through a linkage 266. The rocker 175, therefore, is drawn to its lower position by spring 233a and paper is fed into the lower portion 44 of the copy table 42 in the manner hereinbefore described. When the rear edge of the paper 166 clears the switch fingers 264, the rocker switch 231 again closes and energizes the rocker solenoid 214, moving the rocker 175 forward and pinching the paper 166 between the pincher rolls 177 and the smooth rolls 182, as shown in Figure 32, thereby feeding the paper toward the fluted rolls 178 which direct the paper to the photographing aperture 76 to photograph the opposite side of the paper 166. It is to be noted that the deflecting fingers 164 and the rocker 175 are rotated simultaneously by the rocker solenoid 214 or by spring 233a, but that paper is never at both places at the same time, so that only one of these members at a time is accomplishing its functional purpose.

When the paper 166 strikes the main paper fingers 94 for the second time, it operates the thermionic relay 203 which operates the power relay 216 to turn on the lamps 108, de-energizes the clutch solenoid 149 to permit film transport and energizes solenoid 216 of stepping relay 213 to close contacts 225, 226 so that when the paper 166 clears the photographing aperture 76 the contacts 207, 208 of the electronic relay open and the gate solenoid 215 is energized to depress the gates 242, thus permitting additional copy to enter the machine. The first paper continues around the paper roll 56 until it again strikes the fingers 261 to operate the paper roll switch 229, thus energizing solenoid 217 of the stepping relay 212 to open contacts 223, 224. This de-energizes the rocker solenoid 214, permits spring 233a to raise the guide fingers 164 and directs the paper to the exit chute 43.

As soon as the next piece of paper reaches the fingers 261 to operate the paper roll switch 229, the stepping relay 212 is again operated to close contacts 223, 224, thus energizing the rocker solenoid 214 to drop deflectors 164 and direct the next piece of paper to the turnover mechanism, whereupon the above sequence is repeated. The flow chart, Figure 49, shows when the various devices are energized or de-energized, or have their contacts opened or closed, at each stage of the cycle of operation.

Referring to Figures 2, 17, and 41, a transformer 269 is connected to the power source L1, L2 and supplies current to a pilot light 271 on the front of the cabinet when the film alarm switch 128 in the camera box 72 closes because of breakage in or lack of film. The switch 128 is provided with an arm 272 and a roller 273 that contacts the film and is arranged so that, as long as film is present, the switch remains open. As soon as film is not present, the switch 128 closes and lights the pilot lamp so that attention is immediately directed to the lack of film or a break in film inside the camera box.

*Electric interlock system for camera box door*

Referring now to Figures 41, 45, 46, 46a and 47 for a description of the camera box interlock system, a timing motor 274 is provided preferably in an enclosure 75 on the side of the camera box 72. As best shown in Figures 45, 46 and 47, the door 74 is provided with a latch 276 which is operated by a latch cam 277 rotated by the timing motor 274 through a shaft 278. The cam moves a plate 280 into or out of engagement with a pin 280a. A single lobe cam 279 and a double lobe cam 281 are rotated by the timing motor 274 to operate a switch 282 and switch 232 in a predetermined sequence. A push button switch 283 is provided outside the camera box and is connected in series with a switch 284 which is closed by the door. The push button switch 283 also shunts out switch 282 when the contacts of switch 283 are closed.

The purpose of the interlock system is to ensure that after loading, a predetermined length of unexposed film is run off the film reel 129 before paper is photographed, so that only unexposed film is present for photographing, and also to ensure that a predetermined amount of unexposed film is run off the film reel 129 before the door 74 of the camera box may be opened, so that exposed film will not be spoiled. This is accomplished in the following manner:

Assuming that the door 74 is closed, the switch 284 has been mechanically closed by the door 74, the latch 276 is locked, switch 282 is open and switch 232 is closed. The position of the cams and switches at this time is shown in Figure 46. Figure 46a shows the relative position of cams 277, 279 and 281 to effect the following operations.

If the operator now wishes to open the door 74 for reloading film or for some other purpose, the push button switch 283 is manually closed, thus connecting the timing motor 274 to line L1, L2 through the closed switch 284. The latch cam 277 starts to rotate, as well as cams 279 and 281. After a relatively short period of time, the contacts of switch 282 close, so that the operator may release the push button switch 283, but the timing motor 274 will continue to run. After another relatively short period of time, cam 281 opens the contacts of switch 232, thus breaking the circuit to one side of the clutch solenoid 149 to deenergize the solenoid and permit the master wheel 123 to drop and effect film transport in the manner hereinbefore described. Preferably, about 10 inches of film is run off, at which time cam 281 again closes the switch 232, thus energizing the clutch solenoid 149 and stopping film transport. Shortly thereafter the latch cam 277 moves the plate 280 to disengage the pin 280a and releases the latch 276, the door 74 opens, thus opening switch 284 and stopping the timing motor 274. The position of the cams and switches at this time is shown in Figure 45.

After film is reloaded and it is desired to close the door 74 and start photographing, it is necessary first to hold the door in the closed position for a short time. This mechanically closes switch 284 and again starts the timing motor 274, since switch 282 is still in the closed position. After a short interval the latch cam 277 closes the latch 276 and the door 74 is held closed. The timing motor 274 continues to run and cam 281 opens switch 232, thereby deenergizing the clutch solenoid 149 and again permitting film transport. After sufficient film is run off the film reel 129, cam 281 again closes switch 232, thus energizing the clutch solenoid to stop film transport and place the machine in condition for starting to photograph documents. After a short time interval, cam 279 opens switch 282 and stops operation of the timing motor 274.

*Second embodiment of film drive mechanism*

Referring now to Figures 50 and 51, a second embodiment of a film drive mechanism is shown, Figure 50 showing the mechanism in the driving position, and Figure 51 in the disengaged position. Like numerals refer to like parts of the apparatus described in connection with the first embodiment of the invention. In this embodiment of the invention, a master film wheel 300 rotatably mounted at 299 is utilized to carry the film. A driving member 301 is directly attached to the main shaft 58 of the paper roll 56 in the same manner as shown in Figure 11. However, in the present embodiment of the invention, both the master film wheel 300 and the driving member 301 rotate on fixed bearings and do not contact each other.

A tong shaped device is provided in this embodiment and comprises one arm 302 pivoted at 303, which arm carries a bracket 304 on which a film take-up wheel 305 is rotatably mounted, so that it will skid on take-up roll 132 when necessary, in the same manner as described in referring to the first embodiment of the invention. A second arm 306 is pivoted at 307 and carries a bracket 308 pivotally mounted at 309 on which two film contacting wheels 311 and 312 are rotatably mounted.

A toggle consisting of two leverage members 313 and 314 are pivotally connected at 315 and 316 to the tong arms 302 and 306, respectively, at the upper extremity thereof and are pivotally connected to each other and to an operating member 317 of a clutch solenoid 318 at 319. A compression spring 321 biases the members to the driving position shown in Figure 50 and the solenoid 318, when energized, moves the members to the disengaged position shown by the dotted line 320 on the solenoid in Figure 51.

When in the driving position, the film wheels 311 and 312 press film 322 against the driving member 301 and press the film take-up wheel 305 against the film take-up roll 132, and against a second driving member 323 attached to the driving member 301, thus transporting film on which an image is formed through lens 73. In this embodiment, the film is, in effect, pulled around the master wheel 300, which, of course, rotates as film is transported. However, the master film wheel 300 could be stationary, if provided with a polished surface.

When in the disengaged position, that is, when the clutch solenoid 318 is energized in the manner set forth with respect to the first embodiment of the invention by reason of paper closing main contacts 95, the pivot 319 is pulled toward the solenoid 318, thus disengaging the rolls 311 and 312 from the driving member 301 and the film take-up wheel 305 from the second driving member 323, thus stopping film transport. (See Figure 51.)

In order to load or unload film, a lever 324 is provided and is fixedly pivoted near its center at 325. A pin 330 on one end of the lever 324 engages the leverage arms 313 and 314 at their pivot point 319 and the other end of the lever 324 is provided with a handle 326 and a pin 327 which projects into one of two holes 328 or 329. When the pin 327 is placed in hole 329, the leverage mechanism is in the driving position shown in Figure 50 if the solenoid 318 is de-energized, or in an intermediate disengaged position (not shown) if the solenoid 318 is energized. When it is desired to load or unload film, the pin 327 is placed in hole 328 by moving the lever 324, so that pin 330 lifts the pivot point 319 a considerable distance and moves the rolls 311 and 312 a sufficient distance from the driving member 301 and the take-up wheel 305 from driving member 323 that the film may be easily threaded on or off the drive mechanism. This position of the parts is shown in Figure 51.

From the foregoing it will be apparent that a novel, inexpensive and compact flow camera for recording records on microfilm has been provided which will produce absolutely clear pictures of one or both sides of documents.

Although we have herein shown and described two embodiments of our inventive concept, it is obvious that many changes in the arrangement herein shown and described may be made without departing from the spirit of the invention as set forth in the following claims.

What is claimed is:

1. In a photographic device, a camera, a lens, a rotatable drum for transporting documents to be photographed, a shaft for said drum, means for rotating the drum at a predetermined speed, a plate having an aperture therein through which the documents are photographed, a smooth drumlike film driving member directly connected to and rotated by said shaft, a master film wheel in said camera having a portion of its periphery on the focal plane of said lens, other roller means in said camera cooperating with said master film wheel for supporting film to be transported, and a leverage member adapted to shift said master film wheel with the film thereon to place the film into driving contact with said driving member, electro-magnetic means connected to said leverage member and energized during the time a document is moving past the photographing aperture, the peripheral speed of said drum and driving member being proportioned so as to transport film at a predetermined ratio with respect to the speed of the movement of the documents past said photographing aperture.

2. In apparatus for photographing documents, a camera containing film for receiving the image of said documents, means for moving said film, a lens for said camera, a mirror system for transmitting light rays reflected from the documents to said lens and film, a plate having a photographic aperture therein, and means for moving the documents past said aperture, said aperture being at a slight angle from the perpendicular to the direction of the movement of the documents and the edge of said aperture which the documents first contact being slightly lower in the horizontal plane than the opposite edge of the aperture.

3. In apparatus for photographing documents, a camera containing film for receiving the image of said documents, means for moving said film, a lens for said camera, a mirror system for transmitting light rays reflected from the documents to said lens and film, a plate having a photographic aperture therein, means for moving the documents past said aperture, said aperture being at a slight angle from the perpendicular to the direction of the movement of the documents, the edge of said aperture which the documents first contact being slightly lower in the horizontal plane than the opposite edge of the aperture and a light tunnel for conveying light rays reflected from the documents passing under the photographing aperture to the mirror system.

4. In apparatus for photographing documents, a camera containing film for receiving the image of said documents, means for moving said film, a lens for said camera, a mirror system for transmitting light rays reflected from the documents to said lens and film, a plate having a photographic aperture therein, means for moving the documents past said aperture, said aperture being at a slight angle from the perpendicular to the direction of the movement of the documents, the edge of said aperture which the documents first contact being slightly lower in the horizontal plane than the opposite edge of the aperture and a light tunnel for conveying light rays reflected from the documents passing under the photographing aperture to the mirror system, the bottom of the light tunnel being shaped to conform to the angularity of the photographing aperture.

5. In apparatus for photographing documents, a camera containing film, a lens for said camera, a plate having a photographing aperture therein, means for moving documents to be photographed past said aperture, a mirror for reflecting light rays from the documents passing under said aperture, a second mirror set at an angle of 90° to the first mirror for reflecting light rays from said first mirror to said lens and thence to said film, a plurality of structural members for rigidly supporting said mirrors, a rigid two point support for said structural members at one end thereof, and an adjustable single point support for said structural members at the other end thereof, whereby a rigid three point support is provided and adjustment of the angle of both mirrors with respect to said photographing aperture may be effected simultaneously.

6. In apparatus for photographing documents, a camera containing film, a lens for said camera, a plate having a photographing aperture therein, means for moving documents to be photographed past said aperture, a mirror for reflecting light rays from the documents passing under said aperture, a second mirror set at an angle of 90° to the first mirror for reflecting light rays from said first mirror to said lens and thence to said film, a plurality of structural members for rigidly supporting said mirrors, a rigid two point support for said structural members at one end thereof, an adjustable single point support for said structural members at the other end thereof, whereby a rigid three point support is provided and adjustment of the angle of both mirrors with respect to said photographing aperture may be effected simultaneously, an artificial source of light directed onto the document passing the photographing aperture and a housing for said source of light, said housings being supported independently of said mirror supporting members.

7. A machine for photographing moving documents on film in a continuous manner, a cabinet for housing said machine, said cabinet comprising side walls, a removable back wall, a hinged top section, a composite front wall including a control panel, a combination pivoted cover for said control panel when closed and having an upper surface adapted to be used as a feed plate and a passage therein below said surface adapted to be used as a return feed chute for said documents when open, and a second combination hinged cover for other portions of said machine when closed and adapted to function as an exit chute for documents when open.

8. A machine for photographing moving documents on film in a continuous manner, a cabinet for housing said machine, said cabinet comprising side walls, a removable back wall, a hinged top section, a composite front wall including a control panel, a combination pivoted cover for said control panel when closed and having an upper surface adapted to be used as a feed plate and having a passage therein adapted to be used as a return feed chute for said documents when open, and a second combination hinged cover for other portions of said machine when closed and adapted to function as an exit chute for documents when open, said machine being detachably mounted in said cabinet so that when said hinged top section is swung open and the back wall is removed, the machine may be readily removed from said cabinet.

9. In a photographic device, a camera having a lens, means for transporting documents to be photographed through the field of view of said lens, said means including at least one shaft rotating in definite time relation to the movement of said documents, a plate having an aperture therein through which the documents are photographed, a smooth cylindrical film driving member mounted on, directly connected to and rotated by said shaft, a master film wheel in said camera having a portion of its periphery on the focal plane of said lens, other roller means in said camera which, together with said master film wheel and said driving member cooperate to support and transport film, a pintle supporting said master film wheel, a leverage member supported in said camera on a second pintle, said pintles being off-center with respect to each other, spring means normally urging said leverage member in a direction to effect engagement of the master wheel with said drum-like driving member with the film therebetween so that said driving member will move the film, electro-magnetic means connected to said leverage member and adapted when energized to move said leverage member in a direction to disengage said master wheel and film from said driving member, and means under control of the documents for supplying energy to said electro-magnetic means when no document is beneath said aperture.

10. In a photographic device, a camera having a lens, means for transporting documents through the field of view of said lens, said means including at least one rotating shaft, a plate having an aperture therein through which said documents are photographed, a smooth cylindrical film driving member fixed on and rotated by said shaft, transporting means in said camera for supporting film therein and including at least one rotatable wheel mounted on a movable support in said camera so as to be movable relative to and adapted to be placed in frictional engagement with said driving member, means under control of the documents for moving said support and consequently placing said film in said frictional engagement with said cylindrical driving member for causing said film to move on said transporting means during the time a document is moving past said aperture, the speed of said document and the peripheral speed of said driving member being proportionate so as to transport said film at a predetermined ratio with respect to the speed of movement of said documents past said aperture.

11. In a photographic device, a camera having a lens, means for transporting documents through the field of view of said camera, said means including at least one rotating shaft moving in definite relation to the movement of said documents, a plate having an aperture therein through which said documents are photographed, a smooth cylindrical film driving member fixed on and rotated by said shaft, a master film wheel for supporting film on the focal plane of said lens, a movable support in said camera for said master film wheel, said support being adapted to be moved relative to said driving member to place said master film wheel and the film thereon in frictional engagement with said driving member, means under control of documents in said field of view for moving said support to bring said master film wheel and the film thereon into frictional engagement with said cylindrical driving member thereby causing said master wheel and the film thereon to rotate during the time a document is moving past said aperture, the speed of said document and the peripheral speed of said driving member being proportioned so as to transport film at a predetermined ratio with respect to the speed of movement of the document past said aperture.

12. In a photographic device, a camera having a lens, means for transporting documents to be photographed through the field of view of said camera, said means including at least one shaft rotating in definite relation to the movement of said documents, a plate having an aperture therein through which the documents are photographed, a smooth cylindrical film driving member mounted on and rotated by said shaft, a rotatable master film wheel for supporting film in said camera so that it may be moved, said master film wheel being adapted to be moved into frictional engagement with said driving member, and means under control of documents passing through said field of view for bringing said driving member and the film on said master film wheel into said frictional engagement to cause said master film wheel to rotate and move film during the time a document is moving past said aperture, the speed of the transported documents and the peripheral speed of said driving member being proportioned so as to transport film at a predetermined ratio with respect to the speed of movement of the documents past said photographing aperture.

13. In a photographic device, a camera having a lens, means for transporting documents through the field of view of said lens, said means including at least one shaft rotating in definite relation to the movement of said documents through said field of view, a plate having an aperture therein through which the documents are photographed, a smooth cylindrical film driving member keyed onto said shaft and rotated thereby, means in said camera for supporting film in such a manner that it may be transported therethrough, said means including a member adapted to support said film on the focal plane of said lens, resilient means for effecting engagement of the film and said driving member to transport film during the time a document is moving past said aperture, and a solenoid adapted to be energized under control of the documents moving past said aperture for effecting disengagement of the film and the driving member, the speed of said documents and the peripheral speed of said driving member being proportioned so as to transport film at a predetermined ratio with respect to the speed of movement of documents past said aperture.

14. In a photographic device, a camera having a lens, means for transporting documents through the field of view of said lens, said means including at least one rotating shaft moving in definite timed relation to the movement of said documents through said field of view, masking means for said documents having a slot therein through which said documents are photographed, a smooth cylindrical film driving member fixed on and rotated by said shaft, transporting means in said camera for transporting a photo-sensitive web past the focal plane of said lens, means forming an optical path between said slot and said web, means including a master film wheel positioned between said driving member and said lens for supporting said web on said optical path, mechanism including a support for said master film wheel which is movable relative to said driving member, and spring means normally urging said master film wheel and said web into driven relation with said smooth cylindrical film driving member, magnetic means for nullifying the urge of said last means, and thereby disengaging said web from said driving member, and means controlled by said documents including electrical means actuated thereby for deenergizing said magnetic means and allowing said means normally urging to re-engage said web with said film driving member.

15. In a photographic device, a camera having a lens, means for transporting documents to be photographed through the field of view of said camera, said means including at least one rotating shaft, a plate having an aperture therein through which the documents are photographed, a smooth cylindrical film driving member keyed to and rotated by said shaft and positioned within said camera, a rotatable master film wheel within said camera for supporting film therein to be moved across the focal plane of said lens, means pivotally supporting said master film wheel, and means under control of documents passing through the field of view of said camera for moving said master film wheel about said pivotal support so that the driving member engages the film on the master film wheel in one position to move film during the time a document is moving past the photographing aperture and for disengaging the driving member from the film in another position to position the movement of the film after the document has passed said aperture, the speed of said documents and the peripheral speed of said cylindrical driving member being proportioned so as to transport film at a predetermined ratio with respect to the speed of movement of the documents past said photographing aperture.

16. In a photographic device, a camera having a lens, means for transporting documents through the field of view of said lens, said means including at least one shaft rotating in definite relation to the movement of said documents, a smooth cylindrical film driving member mounted on, keyed to, and movable with said shaft, a plate having an aperture therein through which the documents are photographed, a rotatable master film wheel for supporting film so that the latter my be moved, a portion of the periphery of said master wheel lying on the focal plane of said lens, eccentrically mounted means pivotally supporting said master film wheel, electro-magnetic means for moving said master film wheel about said pivotal mounting to engage said film driving member with the film therebetween during the time a document is passing under the photographing aperture, control means for said electro-magnetic means actuated by the documents during said time, and spring means for moving said master film wheel out of contact with said film driving member after a document has passed said photographing aperture, the speed of movement of said documents and the peripheral speed of said cylindrical driving member being proportioned so as to transport film at a predetermined ratio with respect to the speed of the movement of said documents past said aperture.

17. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a rotatable master film wheel for supporting film so that the film may be moved, means including a pair of pintles off center with respect to each other, and a leverage member cooperating to support said master film wheel, spring means urging said leverage member and thereby causing said master film wheel to engage said film driving member with the film therebetween for transporting film during the time the document is passing under said aperture, electro-magnetic means acting against the urge of said spring means for disengaging said master film wheel and the film from said film driving member, and control means for said electro-magnetic means actuated by the documents in time relation with the intervals between said documents as they are transported through said field of view, for holding said master film wheel out of contact with said film driving member, the movement of said documents and the peripheral speed of said film driving member being proportioned so as to transport film at a predetermined ratio with respect to the speed of the movement of the documents past said aperture.

18. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a land on said film driving member providing a contact area considerably narrower than the width of the film, a master film wheel for supporting film so it may be moved in said camera, means for pivotally supporting said master film wheel, means for moving the master film wheel about said pivotal support to engage and disengage the film between the master film wheel and said driving member land, the speed of movement of said documents and the peripheral speed of the surface of said land being proportioned so as to transport film at a predetermined ratio with respect to the speed of movement of the documents past said aperture.

19. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a land on said film driving member providing a contact area considerably narrower than the width of the film, a master film wheel for supporting film so that it may be moved, a portion of the periphery of said master film wheel lying on the focal plane of said lens, means pivotally supporting said master film wheel, and resilient means for moving and biasing said master film wheel about said pivotal support to cause it to engage said land with the film therebetween, whereby high contact pressure is produced between the relatively small area of said land and the film to prevent slippage, the speed of said documents and the peripheral speed of the surface of said land being proportioned so as to transport film at a predetermined ratio with respect to the speed of movement of the documents past said aperture.

20. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a rotatable master film wheel for supporting film in a manner that film may be transported, a portion of the periphery of said master film wheel lying on the focal plane of said lens, a pivotal support for said master film wheel, resilient means for moving the master film wheel on its pivotal support to grip the film between the master film wheel and said film driving member to transport film during the time a document is moving past the photographing aperture, and a solenoid adapted to be energized to move the master film wheel on its pivotal support in a direction to disengage the film from the film driving member and stop film transport after a document has passed said aperture.

21. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a rotatable master film wheel for supporting film in a manner that it may be transported, a portion of the periphery of said master film wheel being spanned by the focal plane of said lens, a pivotal support for the master film wheel, a spring biased leverage member normally urging the master film wheel about its support in a direction to grip the film between the master film wheel and said film driving member to transport film during the time a document is moving past said aperture, a cam member adapted to move said leverage member against the biasing of said spring in one position, and a solenoid adapted to be energized under control of documents passing beneath said aperture to effect rotation of said cam member and move the master film wheel on its pivotal support in a direction to disengaged the film from the driving member after a document has passed the photographing aperture.

22. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a rotatable master film wheel for supporting film in a manner that film may be transported, a portion of the periphery of said master film wheel being in the focal plane of said lens, a pivotal support for the master film wheel, a spring biased leverage member for moving the master film wheel about its pivotal support for gripping the film between the master film wheel and the film driving member to transport film during the time a document is moving past the photographing aperture, a cam member adapted to move said leverage member against the biasing spring in one position, a solenoid adapted to be energized for causing said cam member to move the master film wheel on its pivotal support in a direction to disengage the film from said driving member after the document has passed the photographing aperture, said solenoid being energized and deenergized to effect the movements aforesaid under control of means engaged by the documents, and a handle attached to said cam member for manually rotating the latter to move the master film wheel to a position to facilitate the loading or unloading of film.

23. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a rotatable master film wheel for supporting film in a manner that film may be transported, a portion of the periphery of said master film wheel being in the focal plane of said lens, a pivotal support for the master film wheel, a spring biased leverage member for moving the master film wheel about its pivotal support for gripping the film between the master film wheel and the film driving member to transport film during the time a document is moving past the photographing aperture, a cam member adapted to move said leverage member against the biasing spring in one position, a solenoid adapted to be energized under control of means actuated by the documents to rotate said cam member and move the master film wheel on its pivotal support to disengage the film from the film driving member after the document has passed the photographing aperture, a handle attached to said cam member to manually rotate it for moving the master film wheel to a position to facilitate loading or unloading of film, said camera including a camera box for containing said master film wheel, said driving member, said leverage member, said cam member and handle, a door for said camera box, and a bumper on said door positioned to strike said handle and prevent the door from closing when the cam member is in the film loading or unloading position.

24. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a rotatable master film wheel in said camera for supporting film in a manner that it may be transported across the focal plane of said lens, a pivotal support for said master film wheel, resilient means urging said master film wheel on its support to grip the film between the master film wheel and the film driving member to transport film during the time a document is moving past the photographing aperture, and a solenoid adapted to be energized under control of documents passing beneath said aperture for moving the master film wheel on its pivotal support to a position out of driving engagement with said driving member to stop film transported after the document has passed the photographing aperture.

25. In a photographic device, a camera having a lens, means for moving documents through the field of view of said lens, said means including at least one shaft rotatable in definite relation to the movement of said documents, a plate having an aperture therein through which the documents are photographed, a smooth cylindrical film driving member fixed on and rotated by said shaft, a rotatable master film wheel in said camera for supporting film so that it may be moved, pivotal mounting means for supporting said master film wheel, means for moving said master film wheel about said pivotal mounting means to engage the film between the master film wheel and the film driving member for transporting film during the time a document is passing under the photographing aperture, and means for moving said master film wheel against contact with the driving member during the time no document is passing under the photographing aperture.

FRED C. YOHN.

REFERENCES CITED

The following references are of record in the file of this patent:

UNITED STATES PATENTS

| Number | Name | Date |
| --- | --- | --- |
| 1,032,378 | Chandler | July 16, 1912 |
| 1,344,896 | Jobke | June 29, 1920 |
| 1,957,889 | Hopkins et al. | May 8, 1934 |
| 1,966,348 | Hughey | July 10, 1934 |
| 2,016,611 | Muller | Oct. 8, 1935 |
| 2,058,415 | Chretien | Oct. 27, 1936 |
| 2,129,326 | Johnson | Sept. 6, 1938 |
| 2,161,391 | Schubert | June 6, 1939 |
| 2,165,418 | Schubert | July 11, 1939 |
| 2,177,135 | Fassel | Oct. 24, 1939 |
| 2,194,808 | Pooley | Mar. 26, 1939 |
| 2,209,342 | Loughridge et al. | July 30, 1940 |
| 2,234,717 | Altman et al. | Mar. 11, 1941 |
| 2,253,052 | Schubert | Aug. 19, 1941 |
| 2,265,975 | Lloyd | Dec. 9, 1941 |
| 2,298,422 | Sandvik et al. | Oct. 13, 1942 |
| 2,357,674 | McConnell | Sept. 5, 1944 |

FOREIGN PATENTS

| Number | Country | Date |
| --- | --- | --- |
| 546,257 | Great Britain | July 3, 1942 |